US012785914B2

(12) United States Patent
Abdelghaffar et al.

(10) Patent No.: US 12,785,914 B2
(45) Date of Patent: Nov. 3, 2026

(54) ADAPTIVE ANTENNA SWITCHING AND RESOURCE CONFIGURATION WITHIN A BANDWIDTH PART

(71) Applicant: QUALCOMM INCORPORATED, San Diego, CA (US)

(72) Inventors: Muhammad Sayed Khairy Abdelghaffar, San Jose, CA (US); Alexandros Manolakos, Escondido, CA (US); Kexin Xiao, Shanghai (CN); Ruiming Zheng, Beijing (CN); Runxin Wang, San Diego, CA (US); Peter Gaal, San Diego, CA (US); Yu Zhang, San Diego, CA (US); Krishna Kiran Mukkavilli, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 415 days.

(21) Appl. No.: 18/264,224

(22) PCT Filed: Apr. 25, 2021

(86) PCT No.: PCT/CN2021/089554
§ 371 (c)(1),
(2) Date: Aug. 3, 2023

(87) PCT Pub. No.: WO2022/226679
PCT Pub. Date: Nov. 3, 2022

(65) Prior Publication Data

US 2024/0048348 A1 Feb. 8, 2024

(51) Int. Cl.
*H04L 5/00* (2006.01)
*H04L 1/1607* (2023.01)

(52) U.S. Cl.
CPC .......... *H04L 5/0098* (2013.01); *H04L 5/0023* (2013.01); *H04L 5/0051* (2013.01); *H04L 5/0094* (2013.01); *H04L 1/1614* (2013.01)

(58) Field of Classification Search
CPC ... H04L 1/1614; H04L 5/0023; H04L 5/0051; H04L 5/0094; H04L 5/0098
See application file for complete search history.

(56) References Cited

U.S. PATENT DOCUMENTS 10,778,475 B2 9/2020 Chen et al.
2019/0281588 A1 * 9/2019 Zhang .................. H04W 52/08
(Continued)

OTHER PUBLICATIONS

International Search Report and Written Opinion—PCT/CN2021/089554—ISA/EPO—Oct. 18, 2021.
(Continued)

*Primary Examiner* — Kent Krueger
(74) *Attorney, Agent, or Firm* — HOLLAND & HART LLP

(57) ABSTRACT

Methods, systems, and devices for wireless communications are described. A user equipment (UE) may receive, from a base station, control signaling indicating a configuration for use by the UE to select one or more of a plurality of resource sets for a bandwidth part (BWP) for the UE, where each of the resource sets comprise reference signal resources that correspond to one or more antenna ports of the UE. The UE may receive, from the base station, an activation message instructing the UE to activate at least one resource set of the plurality of resource sets for reference signal transmission using the BWP. The UE may transmit a reference signal over the activated resource set using the BWP and at least one antenna port of the one or more antenna ports based at least in part on the activation message, the antenna port corresponding to the activated resource set.

30 Claims, 24 Drawing Sheets

(56) References Cited

U.S. PATENT DOCUMENTS

| | | | | |
|---|---|---|---|---|
| 2020/0106647 | A1* | 4/2020 | Chen | H04W 72/04 |
| 2020/0213161 | A1* | 7/2020 | Zhang | H04L 5/0012 |
| 2022/0029764 | A1* | 1/2022 | Liou | H04L 5/0094 |
| 2022/0190886 | A1* | 6/2022 | Islam | H04W 72/1268 |
| 2022/0312440 | A1* | 9/2022 | Bagheri | H04W 72/044 |
| 2023/0112271 | A1* | 4/2023 | Kim | H04L 1/08 370/329 |
| 2023/0141339 | A1* | 5/2023 | Kittichokechai | H04W 24/08 370/329 |

OTHER PUBLICATIONS

ZTE., et al., "MAC CE for Activation/Deactivation of Semi-Persistent SRS", 3GPP TSG RAN WG2 Meeting #101, 3GPP Draft, R2-1801932 MAC CE for Activation or Deactivation of Semi-Persistent SRS, 3rd Generation Partnership Project (3GPP), Mobile Competence Centre, 650, Route Des Lucioles, F-06921 Sophia-Antipolis Cedex, France, RAN WG2, No. Athens, Greece, Feb. 26, 2018-Mar. 2, 2018, Feb. 14, 2018 (Feb. 14, 2018), 6 Pages, XP051399044, Section 2.

* cited by examiner

ADAPTIVE ANTENNA SWITCHING AND RESOURCE CONFIGURATION WITHIN A BANDWIDTH PART

CROSS REFERENCE

The present Application is a 371 national stage filing of International PCT Application No. PCT/CN2021/089554 by ABDELGHAFFAR et al. entitled "ADAPTIVE ANTENNA SWITCHING AND RESOURCE CONFIGURATION WITHIN A BANDWIDTH PART," filed Apr. 25, 2021, which is assigned to the assignee hereof, and which is expressly incorporated by reference in its entirety herein.

FIELD OF TECHNOLOGY

The following relates to wireless communications, including adaptive antenna switching and resource configuration within a bandwidth part (BWP).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may support communications using multiple bandwidth parts (BWPs). Each BWP may be associated with a respective sounding reference signal (SRS) antenna configurations. Such configurations, however, may limit flexibility and increase power consumption.

SUMMARY

The described techniques relate to improved methods, systems, devices, and apparatuses that support adaptive antenna switching and resource configuration within a bandwidth part (BWP). Generally, the described techniques provide for a user equipment (UE) to use enhanced sounding reference signal (SRS) antenna switching within an active BWP using Layer 1 (L1) or Layer 2 (L2) signaling. In some cases, if an SRS resource set is activated, all of the resources within that set may be activated, which may be beneficial if there are multiple SRS resource sets for an antenna. In some examples, SRS resource sets may be activated or deactivated based on a bitmap, where each bit in the bitmap may correspond to an SRS resource set identifier (ID). For example, a base station may configure the UE for SRS antenna switching and may activate or deactivate the SRS resources with the bitmap using a medium access control (MAC) control element (MAC-CE) (L2 signaling) or downlink control information (DCI) (L1 signaling). In some cases, all SRS resources across all SRS resource sets may be bitmapped into N bits, where N is a number of SRS resources for a UE with N antenna ports. In some cases, the base station may configure SRS resources via an SRS resource indicator (SRI) or via implicit indication using MAC-CE or DCI. The UE may define a rule to determine which SRS resource sets and SRS resources to activate and deactivate, and may additionally or alternatively use antenna port mapping to determine which SRS resource sets and SRS resources to activate and deactivate.

A method for wireless communications at a user equipment (UE) is described. The method may include receiving, from a base station, a configuration indicating a set of multiple resource sets for a BWP for the UE, each of the set of multiple resource sets including reference signal resources that correspond to one or more antenna ports of the UE, receiving, from the base station, an activation message instructing the UE to activate at least one resource set of the set of multiple resource sets for reference signal transmission using the BWP, and transmitting a reference signal over the activated at least one resource set using the BWP and at least one antenna port of the one or more antenna ports based on the activation message, the at least one antenna port corresponding to the activated at least one resource set.

An apparatus for wireless communications at a UE is described. The apparatus may include a processor, memory coupled with the processor, and instructions stored in the memory. The instructions may be executable by the processor to cause the apparatus to receive, from a base station, a configuration indicating a set of multiple resource sets for a BWP for the UE, each of the set of multiple resource sets including reference signal resources that correspond to one or more antenna ports of the UE, receive, from the base station, an activation message instructing the UE to activate at least one resource set of the set of multiple resource sets for reference signal transmission using the BWP, and transmit a reference signal over the activated at least one resource set using the BWP and at least one antenna port of the one or more antenna ports based on the activation message, the at least one antenna port corresponding to the activated at least one resource set.

Another apparatus for wireless communications at a UE is described. The apparatus may include means for receiving, from a base station, a configuration indicating a set of multiple resource sets for a BWP for the UE, each of the set of multiple resource sets including reference signal resources that correspond to one or more antenna ports of the UE, means for receiving, from the base station, an activation message instructing the UE to activate at least one resource set of the set of multiple resource sets for reference signal transmission using the BWP, and means for transmitting a reference signal over the activated at least one resource set using the BWP and at least one antenna port of the one or more antenna ports based on the activation message, the at least one antenna port corresponding to the activated at least one resource set.

A non-transitory computer-readable medium storing code for wireless communications at a UE is described. The code may include instructions executable by a processor to receive, from a base station, a configuration indicating a set of multiple resource sets for a BWP for the UE, each of the set of multiple resource sets including reference signal resources that correspond to one or more antenna ports of the UE, receive, from the base station, an activation message instructing the UE to activate at least one resource set of the set of multiple resource sets for reference signal transmission using the BWP, and transmit a reference signal over the activated at least one resource set using the BWP and at least one antenna port of the one or more antenna ports based on the activation message, the at least one antenna port corresponding to the activated at least one resource set.

In some examples of the method, apparatuses, and non-transitory computer-readable medium described herein, receiving the activation message instructing the UE to activate the at least one resource set of the set of multiple resource sets may include operations, features, means, or instructions for receiving a bitmap that activates the at least one resource set of the set of multiple resource sets for reference signal transmission using the BWP, where each bit in the bitmap corresponds to a reference signal resource in the activated at least one resource set.

In some examples of the method, apparatuses, and non-transitory computer-readable medium described herein, receiving the activation message instructing the UE to activate the at least one resource set of the set of multiple resource sets may include operations, features, means, or instructions for receiving a bitmap that activates the at least one resource set of the set of multiple resource sets for reference signal transmission using the BWP, where all reference signal resources in the activated at least one resource set may be activated.

In some examples of the method, apparatuses, and non-transitory computer-readable medium described herein, receiving the activation message instructing the UE to activate the at least one resource set of the set of multiple resource sets may include operations, features, means, or instructions for receiving an SRI including an indication that the at least one resource set of the set of multiple resource sets may be activated for reference signal transmission using the BWP.

Some examples of the method, apparatuses, and non-transitory computer-readable medium described herein may further include operations, features, means, or instructions for receiving an indication of a number of transmit antenna ports for activation at the UE, a number of receive antenna ports for activation at the UE, or a combination thereof.

Some examples of the method, apparatuses, and non-transitory computer-readable medium described herein may further include operations, features, means, or instructions for receiving a control message indicating a reference signal switching mode for activation at the UE for reference signal transmission using the BWP.

Some examples of the method, apparatuses, and non-transitory computer-readable medium described herein may further include operations, features, means, or instructions for activating the at least one resource set of the set of multiple resource sets for reference signal transmission using the BWP based on a set of rules that indicates respective reference signal resources to activate for each of the set of multiple resource sets, a mapping between one or more antenna ports of the UE and reference signal resources for reference signal transmission using the BWP, or a combination thereof.

In some examples of the method, apparatuses, and non-transitory computer-readable medium described herein, receiving the activation message instructing the UE to activate the at least one resource set of the set of multiple resource sets may include operations, features, means, or instructions for receiving an indication to activate a number of resource sets of the set of multiple resource sets, a number of reference signal resources of a set of multiple reference signal resources per resource set, or a combination thereof, for reference signal transmission using the BWP.

Some examples of the method, apparatuses, and non-transitory computer-readable medium described herein may further include operations, features, means, or instructions for receiving a second activation message instructing the UE to deactivate one or more resource sets of the set of multiple resource sets and deactivating the one or more resource sets of the set of multiple resource sets.

In some examples of the method, apparatuses, and non-transitory computer-readable medium described herein, a first set of reference signal resources may be activated and a second set of reference signal resources may be deactivated according to an activation rule based on the second activation message, the activation rule indicating activation of reference signal resources based on a reference signal resource identifier (ID), a resource set ID, a codebook usage, a default set of reference signal resources, a default set of resource sets, a signal measurement of one or more antenna ports of the UE, a previous antenna port configuration, or any combination thereof.

Some examples of the method, apparatuses, and non-transitory computer-readable medium described herein may further include operations, features, means, or instructions for receiving a second activation message instructing the UE to reactivate one or more deactivated resources according to a reactivation rule, where the reactivation rule may be based on a reference signal resource identifier (ID), a resource set ID, a lookup table, or any combination thereof.

In some examples of the method, apparatuses, and non-transitory computer-readable medium described herein, receiving the activation message instructing the UE to activate the at least one resource set of the set of multiple resource sets may include operations, features, means, or instructions for determining to reactivate the at least one resource set of a set of multiple deactivated resource sets, at least one reference signal resource of a set of multiple deactivated reference signal resources per resource set, or a combination thereof, for reference signal transmission using the BWP based on an antenna port mapping configuration for the UE.

Some examples of the method, apparatuses, and non-transitory computer-readable medium described herein may further include operations, features, means, or instructions for receiving an indication of a number of antenna ports of the UE per resource set or per reference signal resource to use for reference signal transmission using the BWP, where the indication includes a set of bits indicating an antenna port configuration for the UE, a bitmap indicating which of the number of antenna ports of the UE to use for reference signal transmission, an activation rule, or any combination thereof.

Some examples of the method, apparatuses, and non-transitory computer-readable medium described herein may further include operations, features, means, or instructions for selecting a transmit power per antenna port for reference signal transmission based on the number of antenna ports.

In some examples of the method, apparatuses, and non-transitory computer-readable medium described herein, receiving the activation message instructing the UE to activate the at least one resource set of the set of multiple resource sets may include operations, features, means, or instructions for receiving DCI that includes an SRS configuration instructing the UE to activate the at least one resource set of the set of multiple resource sets for reference signal transmission using the BWP.

Some examples of the method, apparatuses, and non-transitory computer-readable medium described herein may further include operations, features, means, or instructions for transmitting an indication of a capability of the UE to support the set of multiple resource sets for the BWP, each of the set of multiple resource sets including reference signal resources that correspond to one or more antenna ports of the UE.

Some examples, of the method, apparatuses, and non-transitory computer-readable medium described herein may further include operations, features, means, or instructions for transmitting an indication of a capability of the UE to support a set of antenna configurations for antenna switching within the BWP, wherein transmitting an indication of a capability of the UE comprises transmitting UE assistance information or uplink signaling indicating a UE preference for an antenna configuration of the set of antenna configurations.

A method for wireless communications at a base station is described. The method may include transmitting, to a UE, a configuration indicating a set of multiple resource sets for a BWP for the UE, each of the set of multiple resource sets including reference signal resources that correspond to one or more antenna ports of the UE, transmitting, to the UE, an activation message instructing the UE to activate at least one resource set of the set of multiple resource sets for reference signal transmission using the BWP, and receiving a reference signal over the activated at least one resource set using the BWP and at least one antenna port of the one or more antenna ports based on the activation message, the at least one antenna port corresponding to the activated at least one resource set.

An apparatus for wireless communications at a base station is described. The apparatus may include a processor, memory coupled with the processor, and instructions stored in the memory. The instructions may be executable by the processor to cause the apparatus to transmit, to a UE, a configuration indicating a set of multiple resource sets for a BWP for the UE, each of the set of multiple resource sets including reference signal resources that correspond to one or more antenna ports of the UE, transmit, to the UE, an activation message instructing the UE to activate at least one resource set of the set of multiple resource sets for reference signal transmission using the BWP, and receive a reference signal over the activated at least one resource set using the BWP and at least one antenna port of the one or more antenna ports based on the activation message, the at least one antenna port corresponding to the activated at least one resource set.

Another apparatus for wireless communications at a base station is described. The apparatus may include means for transmitting, to a UE, a configuration indicating a set of multiple resource sets for a BWP for the UE, each of the set of multiple resource sets including reference signal resources that correspond to one or more antenna ports of the UE, means for transmitting, to the UE, an activation message instructing the UE to activate at least one resource set of the set of multiple resource sets for reference signal transmission using the BWP, and means for receiving a reference signal over the activated at least one resource set using the BWP and at least one antenna port of the one or more antenna ports based on the activation message, the at least one antenna port corresponding to the activated at least one resource set.

A non-transitory computer-readable medium storing code for wireless communications at a base station is described. The code may include instructions executable by a processor to transmit, to a UE, a configuration indicating a set of multiple resource sets for a BWP for the UE, each of the set of multiple resource sets including reference signal resources that correspond to one or more antenna ports of the UE, transmit, to the UE, an activation message instructing the UE to activate at least one resource set of the set of multiple resource sets for reference signal transmission using the BWP, and receive a reference signal over the activated at least one resource set using the BWP and at least one antenna port of the one or more antenna ports based on the activation message, the at least one antenna port corresponding to the activated at least one resource set.

In some examples of the method, apparatuses, and non-transitory computer-readable medium described herein, transmitting the activation message instructing the UE to activate the at least one resource set of the set of multiple resource sets may include operations, features, means, or instructions for transmitting a bitmap that activates the at least one resource set of the set of multiple resource sets for reference signal transmission using the BWP, where each bit in the bitmap corresponds to a reference signal resource in the activated at least one resource set.

In some examples of the method, apparatuses, and non-transitory computer-readable medium described herein, transmitting the activation message instructing the UE to activate the at least one resource set of the set of multiple resource sets may include operations, features, means, or instructions for transmitting a bitmap that activates the at least one resource set of the set of multiple resource sets for reference signal transmission using the BWP, where all reference signal resources in the activated at least one resource set may be activated.

In some examples of the method, apparatuses, and non-transitory computer-readable medium described herein, transmitting the activation message instructing the UE to activate the at least one resource set of the set of multiple resource sets may include operations, features, means, or instructions for transmitting an SRI including an indication that the at least one resource set of the set of multiple resource sets may be activated for reference signal transmission using the BWP.

Some examples of the method, apparatuses, and non-transitory computer-readable medium described herein may further include operations, features, means, or instructions for transmitting an indication of a number of transmit antenna ports for activation at the UE, a number of receive antenna ports for activation at the UE, or a combination thereof.

Some examples of the method, apparatuses, and non-transitory computer-readable medium described herein may further include operations, features, means, or instructions for transmitting a control message indicating a reference signal switching mode for activation at the UE for reference signal transmission using the BWP.

In some examples of the method, apparatuses, and non-transitory computer-readable medium described herein, transmitting the activation message instructing the UE to activate the at least one resource set of the set of multiple resource sets may include operations, features, means, or instructions for transmitting an indication to activate a number of resource sets of the set of multiple resource sets, a number of reference signal resources of a set of multiple reference signal resources per resource set, or a combination thereof, for reference signal transmission using the BWP.

Some examples of the method, apparatuses, and non-transitory computer-readable medium described herein may further include operations, features, means, or instructions for transmitting a second activation message instructing the UE to deactivate one or more resource sets of the set of multiple resource sets.

Some examples of the method, apparatuses, and non-transitory computer-readable medium described herein may further include operations, features, means, or instructions for transmitting a second activation message instructing the UE to reactivate one or more deactivated resource according to a reactivation rule, where the reactivation rule may be based on a reference signal resource identifier (ID), a resource set ID, a lookup table, or any combination thereof.

Some examples of the method, apparatuses, and non-transitory computer-readable medium described herein may further include operations, features, means, or instructions for transmitting an indication of a number of antenna ports of the UE per resource set or per reference signal resource to use for reference signal transmission using the BWP, where the indication includes a set of bits indicating an antenna port configuration for the UE, a bitmap indicating which of the number of antenna ports of the UE to use for reference signal transmission, an activation rule, or any combination thereof.

In some examples of the method, apparatuses, and non-transitory computer-readable medium described herein, transmitting the activation message instructing the UE to activate the at least one resource set of the set of multiple resource sets may include operations, features, means, or instructions for transmitting DCI that includes a an SRS configuration instructing the UE to activate the at least one resource set of the set of multiple resource sets for reference signal transmission using the BWP.

Some examples of the method, apparatuses, and non-transitory computer-readable medium described herein may further include operations, features, means, or instructions for receiving an indication of a capability of the UE to support the set of multiple resource sets for the BWP, each of the set of multiple resource sets including reference signal resources that correspond to one or more antenna ports of the UE.

Some examples, of the method, apparatuses, and non-transitory computer-readable medium described herein may further include operations, features, means, or instructions for receiving an indication of a capability of the UE to support a set of antenna configurations for antenna switching within the BWP, wherein receiving an indication of a capability of the UE comprises receiving UE assistance information or uplink signaling indicating a UE preference for an antenna configuration of the set of antenna configurations.

DETAILED DESCRIPTION

Figure 1:
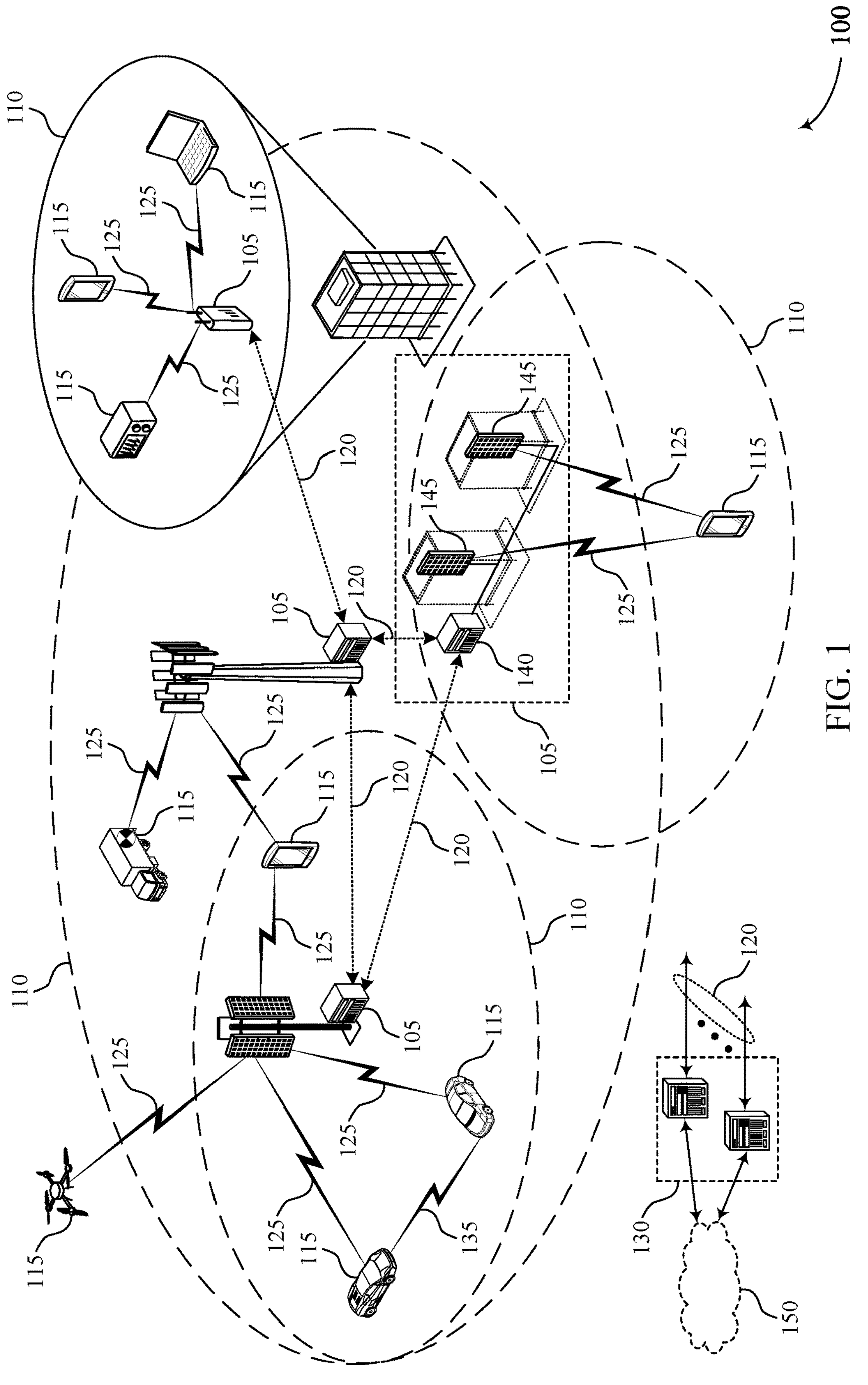
FIG. 1 illustrates an example of a wireless communications system that supports adaptive antenna switching and resource configuration within a bandwidth part (BWP) in accordance with aspects of the present disclosure.

In some wireless communications systems, a user equipment (UE) may transmit sounding reference signals (SRS) via a set of antennas. The UE may be configured to perform antenna switching, which may include using antenna switching resources to transmit reference signals, such as SRSs, using different antenna ports. In some cases, the UE may support a number of antenna switching configurations such that a network may configure multiple bandwidth parts (BWPs) with different SRS configurations for the UE to use. As such, if the network switches from one antenna configuration to a second antenna configuration (e.g., via antenna switching), the UE may switch from a first BWP to a second BWP corresponding to the second antenna configuration. In some cases, the UE may be equipped with more than one antenna (e.g., 4, 6, or 8 antennas) to enable higher throughput applications. For some switching configurations, multiple SRS resources may be configured where each resource is associated with one antenna port of the UE, which may increase signaling overhead. In some instances, the UE sounding all SRS resources using multiple antenna ports of the UE may be inefficient (e.g., if some antenna ports experience bad channels), in which case the UE may turn off some antenna ports (e.g., deactivate corresponding SRS resources) and refrain from sounding using the deactivated antenna ports. Techniques herein enable the UE to adapt (e.g., downgrade or upgrade) the SRS antenna switching configuration within a single BWP such as the operating (e.g., active) BWP, which may reduce power consumption, increase flexibility, and lead to more efficient use of network resources.

Techniques described herein support a UE using enhanced SRS antenna switching within an active BWP using Layer 1 (L1) or Layer 2 (L2) signaling. For example, a base station may transmit signaling to configure the UE with multiple SRS resource sets, each of which may include multiple reference signal resources available for use by the UE for transmission of SRSs. The base station may activate or deactivate SRS resource sets or reference signal resources of one or more reference signal sets by transmitting activation signaling to the UE. In some cases, if an SRS resource set is activated, all of the resources within that set may be activated, which may be beneficial if there are multiple SRS resource sets for a UE. In some examples, SRS resource sets may be activated or deactivated based on a bitmap, where each bit in the bitmap may correspond to an SRS resource set ID. For example, a base station may configure the UE for SRS antenna switching and may activate or deactivate the SRS resources with the bitmap using a medium access control (MAC) control element (MAC-CE) (L2 signaling) or downlink control information (DCI) (L1 signaling). In some cases, all SRS resources across all SRS resource sets may be bitmapped into N bits, where N is the number of SRS resources for a UE with N antenna ports. In some cases, the base station may configure SRS resources via an SRS resource indicator (SRI) or via implicit indication using MAC-CE or DCI. The UE may use a rule, which may be defined or preconfigured at the UE, to determine which SRS resource sets and SRS resources to activate or deactivate, and may additionally or alternatively use antenna port mapping to determine which SRS resource sets and SRS resources to activate or deactivate.

Aspects of the disclosure are initially described in the context of wireless communications systems. Aspects of the disclosure are also illustrated by a bitmap, resource configurations, antenna port maps, and a process flow. Aspects of the disclosure are further illustrated by and described with reference to apparatus diagrams, system diagrams, and flowcharts that relate to adaptive antenna switching and resource configuration within a BWP.

FIG. 1 illustrates an example of a wireless communications system 100 that supports adaptive antenna switching and resource configuration within a BWP in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, RSs, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 may transmit SRS via a set of transmit antenna ports of the UE 115. The UE 115 may be configured to perform antenna switching, which may include using resources for antenna switching to transmit reference signals (e.g., SRSs) using different antenna ports of the UE 115. In some cases, a UE 115 may be equipped with a different number of antenna configurations associated with a number of transmit antenna ports (e.g., SRS ports) and a number of resources to use for transmission (e.g., number of SRS resources) for example, 1 antenna port used to transmit 2 resources (e.g., in case of 1T2R configuration). In some cases, the number of transmit antenna ports and the number of resources may be given by xTyR, where x may be equal to the number of transmit antenna ports to use for transmissions and y may be equal to the number of resources. For example, 2T4R may represent a UE 115 having or being configured to use 2 transmit antenna ports for each of 4 resources, where the UE 115 may transmit SRS using two reference signal resources using the first of two antenna ports, then switch to transmit SRS using two other reference signal resources using the second of two antenna ports. The UE 115 may support a number of antenna switching configurations (e.g., 2T4R, 1T4R, 1T2R) such that a base station 105 may configure multiple BWPs with different SRS configurations for use by the UE 115. In some examples, a narrowband BWP may be configured with a downgraded configuration, such as a 1T2R configuration, relative to a wideband BWP that is configured with a 2T4R configuration. As such, if the network switches from one antenna configuration to another antenna configuration (e.g., via antenna switching), the UE 115 may switch from a first BWP to a second BWP corresponding to the new antenna configuration.

In some examples, the UE 115 may be equipped with a larger number of receive antenna ports (e.g., 6, 8, 10 antenna ports) to enable higher throughput applications. In some cases, the antenna switching configurations may be updated to account for more receive antennas (e.g., in the xTyR configuration, x=1, 2, 4, and y=6, 8), and in some cases, for some antenna switching configuration (e.g., 1T8R), the network may configure the UE 115 with multiple SRS resources, where each SRS resource is transmitted using a single antenna port (e.g., 8 SRS resources for the configuration 1T8R). In some cases, it may be difficult for the network to configure the UE 115 within one slot, and as such, multiple SRS resource sets may be used (e.g., 4 SRS resource sets with 2 SRS resources per set) to allow the network to divide the resources and multiplex with different uplink signals or channels. In some channel conditions, the network may not have the UE 115 sound all SRS resources (e.g., because some ports may experience poor channel conditions, the network may limit maxMIMO to a small number). In some cases, the UE 115 may turn off some antennas and subsequently, may not sound the deactivated antennas, which may reduce the power consumed by the UE 115. Given potential power savings and a more efficient use of network resources, the techniques herein enable the UE 115 to adapt (e.g., downgrade or upgrade) the SRS antenna switching configuration within the operating (e.g., active) BWP.

In some cases, a base station 105 may transmit a MAC-CE command to indicate which SRS resources within an SRS resource set may be activated or deactivated via a bitmap. In some cases, an N-bit field may control which of the SRS resources of the set may be switched on and off, where N is the number of SRS resources in the set. For example, if an aperiodic SRS resource set with 4 SRS resources may be triggered with codepoint 01 and 10, then the MAC-CE command may indicate that for codepoint 01, resources 0 and 2 may be switched on, whereas for codepoint 10, resources 1 and 3 may be switched on. Such a mechanism may be supported for specific antenna switching use cases, such as if an SRS resource set has more than 4 SRS resources. In some examples, adapting SRS resources within an SRS resource set may be limiting as there may be multiple SRS resource sets for an xTyR antenna switching configuration (e.g., 1T4R using 4 SRS resource sets). Instead of adapting the SRS resources and SRS resource sets, the network may indicate different SRS antenna switching configurations directly (e.g., from 2T8R to 2T4R) using Layer 2 (L2) mechanisms (e.g., MAC-CE). That is, adaptation on the resource set level using Layer 1 (L1) (e.g., DCI) and L2 (e.g., MAC-CE) mechanisms may be beneficial.

According to aspects herein, the UE 115 may use enhanced SRS antenna switching within an active BWP using L1 or L2 signaling. In some cases, if an SRS resource set is activated, all of the resources within that set may be activated, which may be beneficial if there are multiple SRS resource sets for an antenna port. In some examples, SRS resource sets may be activated or deactivated based on a bitmap, where each bit in the bitmap may correspond to an SRS resource set ID. For example, the base station 105 may configure the UE 115 for SRS antenna switching and may activate or deactivate the SRS resources with the bitmap using a MAC-CE (L2 signaling) or DCI (L1 signaling). In some cases, all SRS resources across all SRS resource sets may be bitmapped into N bits, where N is the number of SRS resources for a UE 115 with N antenna ports. In some cases, the base station 105 may configure SRS resources via an SRI or via implicit indication using MAC-CE or DCI. The UE 115 may define a rule to determine which SRS resource sets and SRS resources to activate and deactivate, and may additionally or alternatively use antenna port mapping to determine which SRS resource sets and SRS resources to activate and deactivate.

Figure 2:
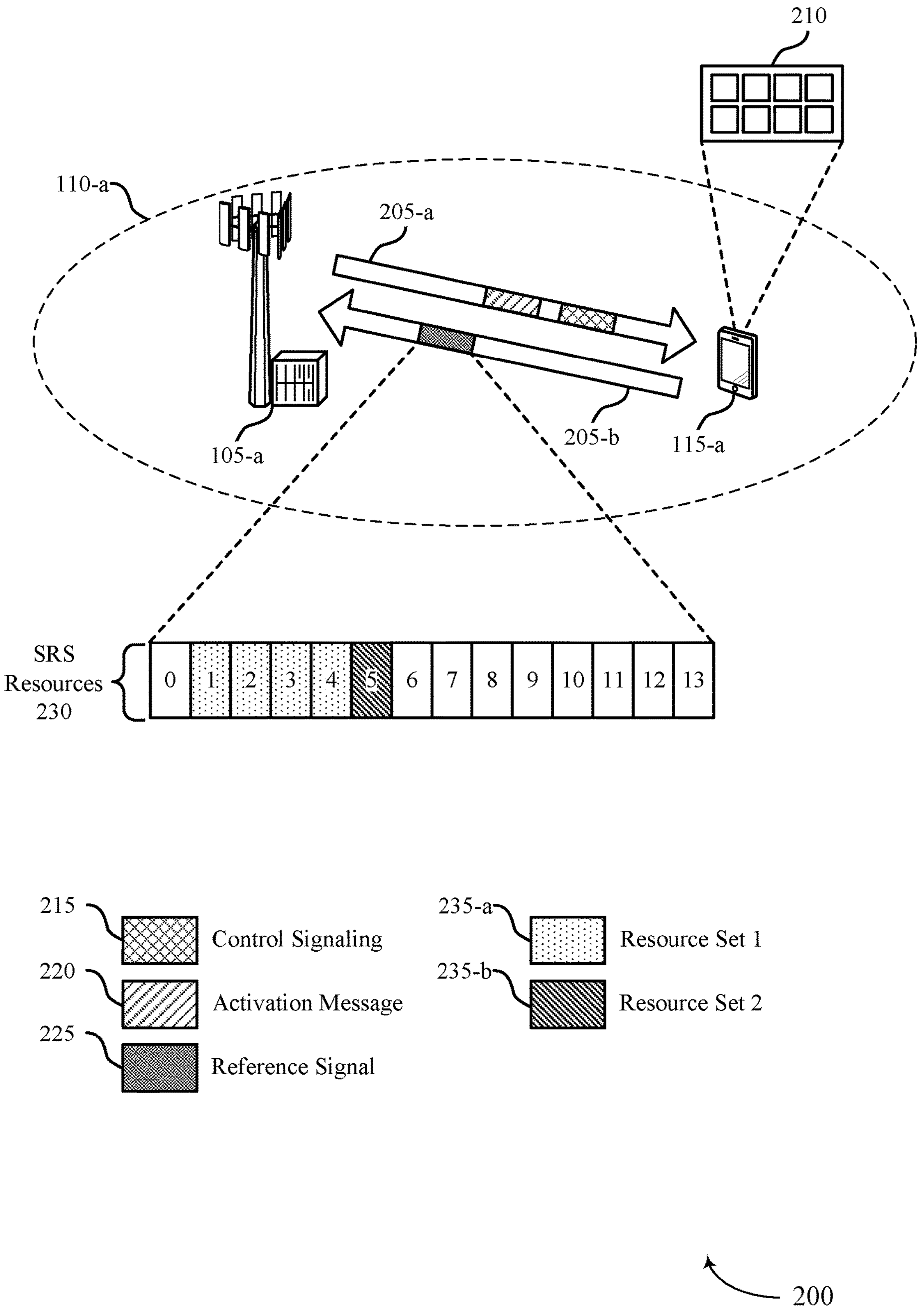
FIG. 2 illustrates an example of a wireless communications system that supports adaptive antenna switching and resource configuration within a BWP in accordance with aspects of the present disclosure.

FIG. 2 illustrates an example of a wireless communications system 200 that supports adaptive antenna switching and resource configuration within a BWP in accordance with aspects of the present disclosure. In some examples, wireless communications system 200 may implement or be implemented by aspects of wireless communications system 100. For example, the wireless communications system 200 may include a UE 115-*a* and a base station 105-*a*, which may be examples of a UE 115 and a base station 105 as described with reference to FIG. 1.

The UE 115-*a* may communicate with the base station 105-*a* in a geographic coverage area 110-*a* supported by the base station 105-*a*. For example, the base station 105-*a* may transmit one or more downlink signals to the UE 115-*a* via a communications link 205-*a* (e.g., a downlink communications link) and the UE 115-*a* may transmit one or more uplink signals to the base station 105-*a* via a communications link 205-*b* (e.g., an uplink communications link). In some cases, the UE 115-*a* may have a number of antenna ports 210 to use for receiving downlink transmissions.

In some examples, the UE 115-*a* may perform SRS antenna switching, which may involve the UE 115-*a* transmitting one or more SRSs to the base station 105-*a* over one or more transmit antenna ports. In some cases, the base station 105-*a* may transmit control signaling 215 via the communications link 205-*a* that may indicate a configuration for the UE 115-*a* to use in selecting one or more SRS resource sets (also referred to herein as resource sets) for a BWP for the UE 115-*a*. Each of the SRS resource sets may include reference signal resources (e.g., SRS resources) that correspond to one or more antenna ports 210 of the UE 115-*a*. The base station 105-*a* may configure the one or more SRS resource sets aperiodically, semi-persistently, or periodically for an active BWP of the UE 115-*a*. The base station 105-*a* may also transmit an activation message 220 to the UE 115-*a* via the communications link 205-*a*. The activation message 220 may instruct the UE 115-*a* to activate at least one SRS resource set for reference signal transmissions using the active BWP.

The UE 115-*a* may transmit an reference signal (e.g., an SRS) over the activated SRS resource set using the active BWP and at least one antenna port 210 via the communications link 205-*b*. For example, the UE 115-*a* may use one or more SRS resources 230 to transmit an SRS to the base station 105-*a*. For example, the UE 115-*a* may use any of the SRS resources 230 (e.g., SRS resource 1 through SRS resource 13) to transmit an SRS to the base station 105-*a*. The SRS resources may be time-frequency resources of the active BWP, such as any of the symbol periods 1 to 13 of a slot and spanning at least a portion of the BWP. The base station 105-*a* may configure the UE 115-*a* with multiple SRS resources 230, which may be grouped into SRS resource sets 235 depending on the use case or usage type (e.g., antenna switching, beam management).

Each SRS resource set 235 may contain a set of SRS resources 230 over which the UE 115-*a* may transmit an SRS, such as a first resource set 235-*a* (e.g., including the SRS resource 1 through the SRS resource 4) and a second resource set 235 (e.g., including the SRS resource 5). The UE 115-*a* and the base station 105-*a* may support SRS resources 230 that span 1, 2, 4, 8, or 12 adjacent symbols with up to a predefined number of ports (e.g., 8) per SRS resource. In some cases, up to a predefined number of SRS resource sets (e.g., 2 SRS resource sets) may be configured for SRS sounding with antenna switching. Each port of an SRS resource may be sounded in each symbol. In some cases, the UE 115-*a* may be configured to use a number of transmit antennas as well as a number of receive antennas. The UE 115-*a* may use up to the number of transmit antennas to transmit signals and may use up to the number of receive antennas to receive signals. In some cases, the number of transmit antennas versus the number of receive antennas may be given by xTyR, where x may be equal to the number of transmit antennas and y may be equal to the number of receive antennas. For example, 2T4R may represent a UE 115-*a* having or being configured to use 2 transmit chains and 4 resources.

In some cases, if an SRS resource set (e.g., the first resource set 235-*a*, the second resource set 235-*b*) is activated, all of the SRS resources 230 within that set may be automatically activated, which may be beneficial if there are multiple SRS resource sets 235 for an antenna. In some examples, SRS resource sets 235 may be activated or deactivated based on a bitmap, where each bit in the bitmap may correspond to an SRS resource set ID. For example, the base station 105-*a* may configure the UE 115-*a* for SRS antenna switching and may activate or deactivate the SRS resources 230 with the bitmap using a MAC-CE (L2 signaling) or DCI (L1 signaling). In some cases, all SRS resources 230 across all SRS resource sets 235 may be bitmapped into N bits, where N is the number of SRS resources 230 for a UE 115-*a* with N antenna ports 210. In some cases, the base station 105-*a* may configure SRS resources 230 via an SRI or via implicit indication using MAC-CE or DCI. The UE 115-*a* may define a rule to determine which SRS resource sets 235 and SRS resources 230 to activate and deactivate, and may additionally or alternatively use antenna port mapping to determine which SRS resource sets 235 and SRS resources 230 to activate and deactivate.

Figure 3:
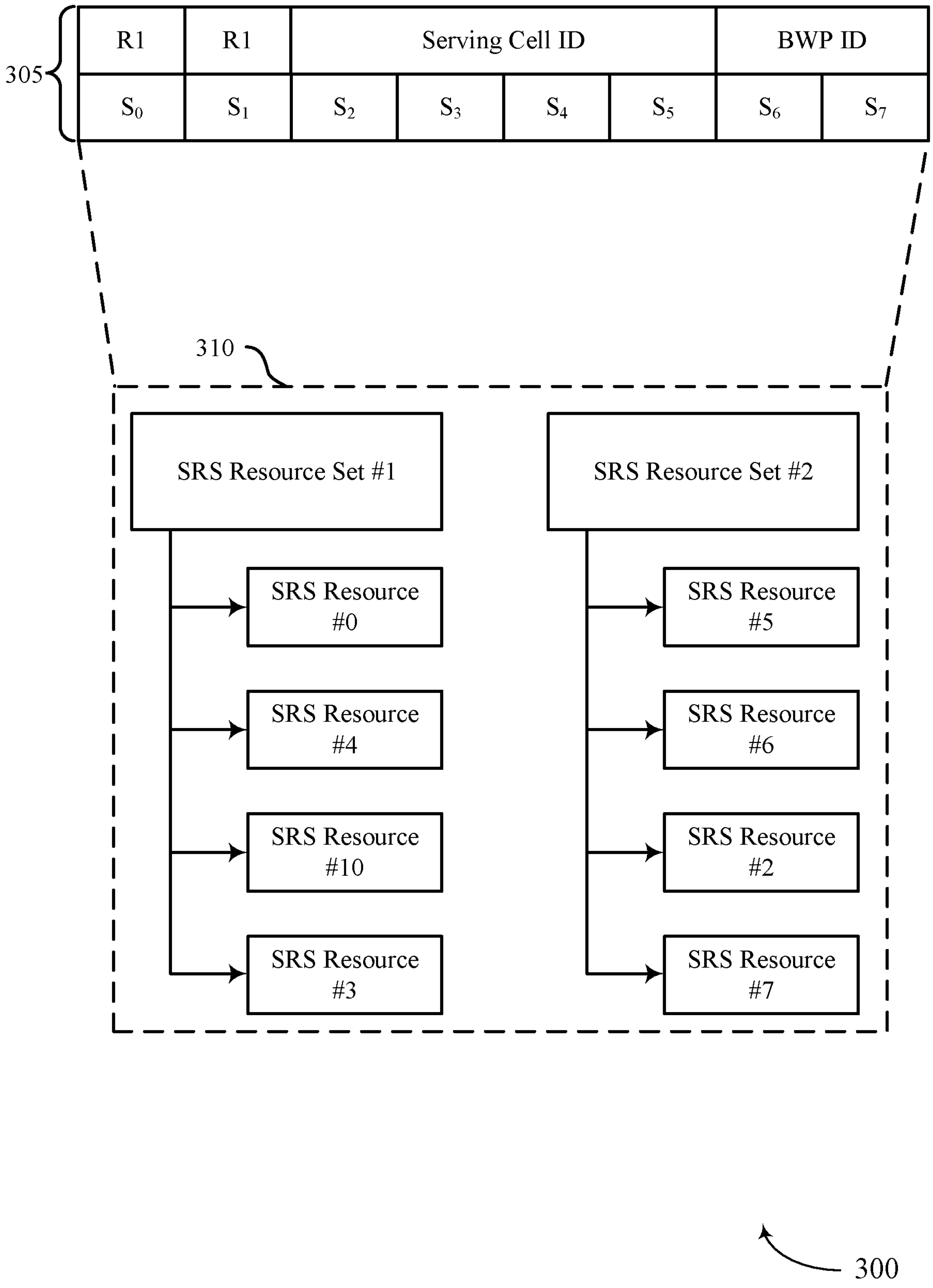
FIG. 3 illustrates an example of a bitmap that supports adaptive antenna switching and resource configuration within a BWP in accordance with aspects of the present disclosure.

FIG. 3 illustrates an example of a bitmap 300 that supports adaptive antenna switching and resource configuration within a BWP in accordance with aspects of the present disclosure. In some examples, the bitmap 300 may implement or be implemented by aspects of wireless communications system 100, for example a UE 115-*a* and a base station 105-*a* as described with reference to FIGS. 1 and 2.

In some cases, a UE 115-*a* may transmit an reference signal (e.g., an SRS) to the base station 105-*a* over an activated SRS resource set using an active BWP and at least one antenna port corresponding to the activated SRS resource set. In some cases, the UE 115-*a* may activate one or more SRS resource sets for reference signal transmissions based on an activation message from the base station 105-*a*. For example, the base station 105-*a* may transmit a bitmap indication for activating SRS resource sets and SRS resources. In some cases, SRS resource sets may be activated or deactivated based on the bitmap, where each bit corresponds to an SRS resource set ID. In some cases, there may be a one-to-one mapping between a bit index and the SRS resource set IDs, which may be RRC configured, or in ascending or descending order based on the SRS resource set ID. In some cases, the bitmap may be sent in a MAC-CE 305, which may include an indication of the BWP being used (e.g., BWP ID), the serving cell (e.g., Serving Cell ID), and reserve bits (e.g., R1 and R0) which may be used for other purposes. In some cases, the MAC-CE 305 may include 8 bits (e.g., $S_0$, $S_1$, $S_2$, $S_3$, $S_4$, $S_5$, $S_6$, and $S_7$), where each bit may correspond to one SRS resource set, mapped according to the SRS resource set IDs. In some cases, an RRC configured table may also indicate the SRS resource set IDs. In some cases, the 8 bits in the MAC-CE may each correspond to an SRS resource, where each SRS resource may be mapped to a different SRS resource set.

In some examples, the UE 115-*a* may be configured with an antenna configuration 1T8R that has two SRS resource sets in the resource configuration 310 (e.g., an SRS Resource Set #1 and an SRS Resource Set #2), where each set has four SRS resources. For example, the SRS Resource Set #1 may include SRS Resource #0, SRS Resource #4, SRS Resource #10, and SRS Resource #3, and the SRS Resource Set #2 may include SRS Resource #5, SRS Resource #6, SRS Resource #2, and SRS Resource #7. In some other cases, the 1T8R antenna configuration may be divided into eight SRS resource sets with one SRS resource in each. In some cases, where there are two SRS resource sets with four SRS resources in each, the MAC-CE 305 may include two bits, corresponding to each of the two SRS resource sets. In some examples, the two bits may be 11, in which case both SRS resource sets and their corresponding SRS resources may be activated (e.g., turned on). In some examples, the two bits may be 01, in which case all of the SRS resources in the SRS Resource Set #1 may be activated and all of the SRS resources in the SRS Resource Set #2 may be deactivated (e.g., turned off), or the two bits may be 10 in which case all of the SRS resources in the SRS Resource Set #2 may be activated and all of the SRS resources in the SRS Resource Set #1 may be deactivated.

In some cases, the UE 115-*a* may activate SRS resource sets and their corresponding SRS resources on the resource level. In some cases, the SRS resource sets may be mapped so that SRS resources are combined across all SRS resource sets. For example, the network may transmit the MAC-CE 305 in which all SRS resources across all SRS resource sets may be bitmapped into N-bit maps, where N is the maximum number of SRS resources across the combined SRS resource sets for a UE 115 with N receive antennas (e.g., N=8 for a UE 115 with 8 receive antennas). In some examples, the mapping of SRS resources to SRS resource sets using this method is based on either an ascending list across all SRS resource sets, or on the SRS resource IDs. As such, all SRS resources within all SRS resource sets may be bitmapped. In some examples, the UE 115-*a* may use an antenna configuration 1T8R that is configured with two SRS resource sets in the resource configuration 310 (e.g., an SRS Resource Set #1 and an SRS Resource Set #2), where each set has four SRS resources. For example, the SRS Resource Set #1 may include SRS Resource #0, SRS Resource #4, SRS Resource #10, and SRS Resource #3, and the SRS Resource Set #2 may include SRS Resource #5, SRS Resource #6, SRS Resource #2, and SRS Resource #7. The UE 115-*a* may receive a bitmap (e.g., with 8 bits) and may determine how the bitmap maps to the SRS resources. In some cases, the bitmapping may be determined based on two options as shown in and described with reference to Table 1.

TABLE 1

| | Option 1 (SRS Resource ID) | Option 2 (SRS Resource ID) |
|---|---|---|
| B0 | SRS resource #0 | SRS resource #0 |
| B1 | SRS resource #4 | SRS resource #2 |
| B2 | SRS resource #10 | SRS resource #3 |
| B3 | SRS resource #3 | SRS resource #4 |
| B4 | SRS resource #5 | SRS resource #5 |
| B5 | SRS resource #6 | SRS resource #6 |
| B6 | SRS resource #2 | SRS resource #7 |
| B7 | SRS resource #7 | SRS resource #10 |

Table 1 provides examples of how SRS resource sets may be bitmapped within the MAC-CE 305. In some cases, the MAC-CE 305 may contain a bitmap with 8 bits (e.g., B0, B1, B2, B3, B4, B5, B6, and B7). The UE 115-*a* may map the SRS resources based on the SRS resource IDs within each SRS resource set. For example, using option 1 as described with reference to Table 1, the UE 115-*a* may map all of the SRS resources in the SRS resource sets based on how the SRS resources are configured. The first bit (e.g., B0) may map to the first resource (e.g., the SRS resource #0) in the SRS Resource Set #1, the second bit (e.g., B1) may map to the second resource (e.g., the SRS resource #4) in the SRS Resource Set #1, and so on for the SRS Resource Set #1 and the Resource Set #2. Using option 2, the UE 115-*a* may map all of the SRS resources in the SRS resource sets based on the SRS resource IDs. For example, the first bit (e.g., B0) may map to the first resource (e.g., the SRS resource #0) in the SRS Resource Set #1, the second bit (e.g., B1) may map to the third resource (e.g., the SRS resource #2) in the SRS Resource Set #2, and so on, with the bits mapping to resources in ascending (e.g., or descending) order of SRS resource IDs across all SRS resource sets. As such, the UE 115-*a* may map the bits in the MAC-CE 305 to the SRS resource IDs, and then may map the SRS resource IDs to the SRS resource sets.

In some cases, the base station 105-*a* may configure SRS resources using an SRI (e.g., via codepoint). The base station 105-*a* may transmit an SRI codepoint to the UE 115-*a*, which may map to a table as shown in and described with reference to Table 2. In some cases, the table may be an RRC configured table of preconfigured (e.g., or otherwise indicated) mapping between bits and SRS resources.

TABLE 2

| SRI | SRS resources |
|---|---|
| 0001 | 4 SRS resources # {0, 1, 2, 3} |
| 0010 | 4 SRS resources # {0, 2, 4, 6} |
| 0011 | 2 SRS resources # {0, 1} |
| 0100 | 2 SRS resources # {2, 3} |
| 0101 | 1 SRS resource # {0} |
| 0110 | 1 SRS resource # {1} |
| 0111 | 1 SRS resource # {2} |
| 1000 | 1 SRS resource # {3} |

In some cases, the mapping shown in Table 2 may be a one-to-one mapping between an SRI and corresponding, activated SRS resources. For example, the SRI codepoint 0001 may indicate that the UE 115-*a* may activate 4 SRS resources with the SRS Resource IDs of 0, 1, 2, and 3. In some examples, the mapping between SRI codepoints and SRS resources may include examples not shown in Table 2.

Figure 4:
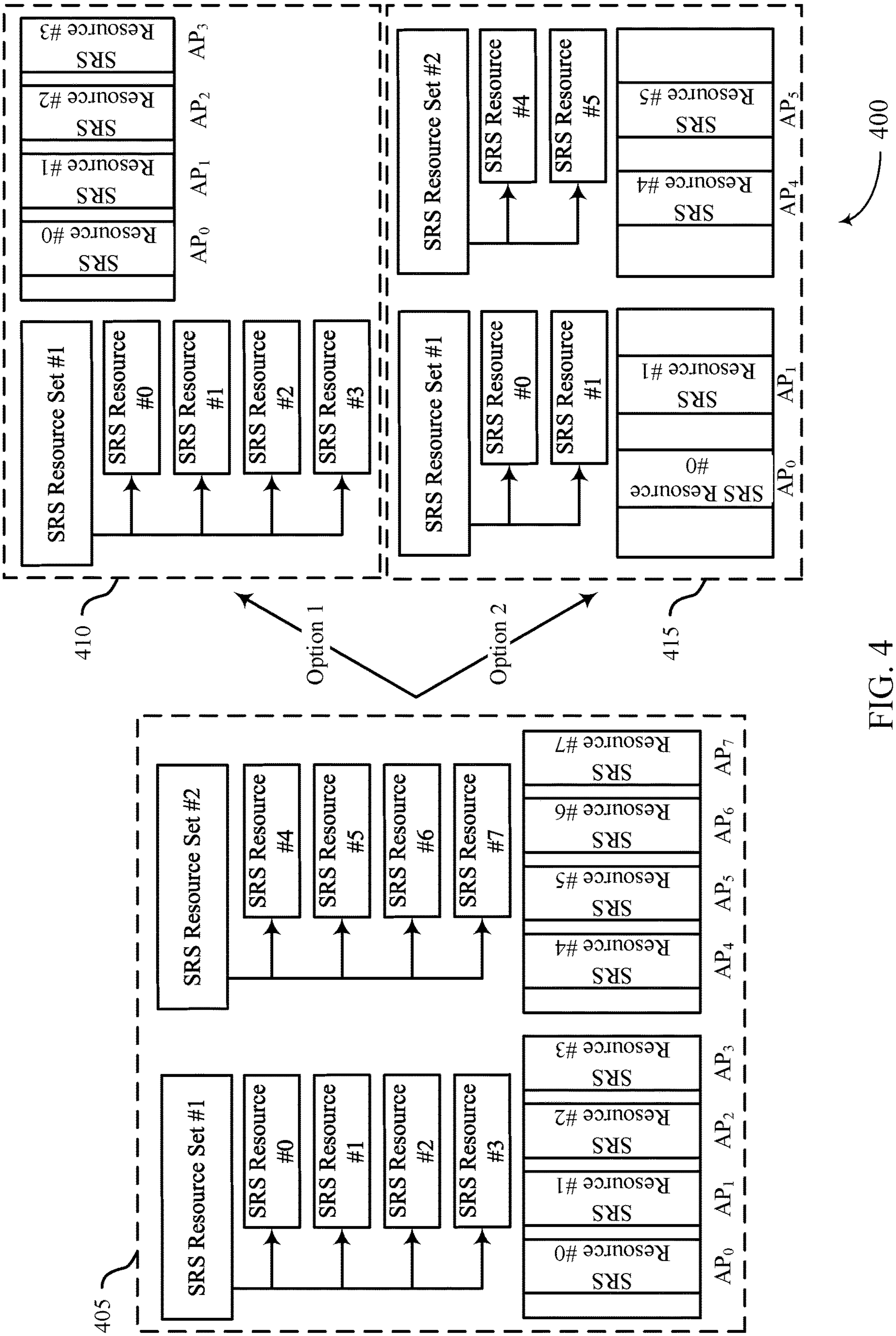
FIG. 4 illustrates an example of a resource configuration that supports adaptive antenna switching and resource configuration within a BWP in accordance with aspects of the present disclosure.

FIG. 4 illustrates an example of a resource configuration 400 that supports adaptive antenna switching and resource configuration within a BWP in accordance with aspects of the present disclosure. In some examples, the resource configuration 400 may implement or be implemented by aspects of wireless communications system 100, for example a UE 115 and a base station 105 as described with reference to FIGS. 1 and 2.

In some cases, the UE 115-*a* may use L1/L2 adaptation of antenna switching per BWP. For example, instead of the network (e.g., a base station 105-*a*) indicating which SRS resources the UE 115-*a* may use, and to reduce signaling overhead, the UE 115-*a* may receive an implicit indication of SRS resource sets and SRS resources. In some cases, the base station 105-*a* may indicate only the number of transmit antennas (e.g., xT) or the number of receive antennas (e.g., yR) in a MAC-CE or DCI. In some examples, if the UE 115-*a* has SRS switching capabilities (e.g., 4T4R, 2T4R, 2T2R, 1T2R, 1T1R), the base station 105-*a* may indicate the exact SRS switching mode to the UE 115-*a*.

In some examples, once the UE 115-*a* receives an indication of the number of transmit antennas or antenna ports and receive antennas or antenna ports it may use, the UE 115-*a* may use a set of rules for determining which SRS resource sets and SRS resources to activate and deactivate. In some cases, the UE 115-*a* may map the indication to the activation and deactivation of SRS resource sets and SRS resources, and may also map the UE 115-*a* antenna ports to the SRS resource sets and SRS resources. In some cases, the UE 115-*a* may use yR adaptation to determine which SRS resource sets and SRS resources to activate and deactivate. The base station 105-*a* may indicate the number of SRS resources per set of the number of SRS resource sets to the UE. For example, if the UE 115-*a* uses a 1T8R antenna configuration using 4 SRS resource sets with 2 SRS resources per set, the base station 105-*a* may fall back to a 1T4R configuration by keeping only 4 SRS resources out of the total 8 SRS resources (e.g., either 2 SRS resource sets of 1 SRS resource per set). To do this, the UE 115-*a* may deactivate or activate the SRS resource set, may deactivate or activate the SRS resources within each set, or a combination thereof.

The UE 115-*a* may be configured with the resource configuration 405, which may be a 1T8R configuration, and the base station 105-*a* may indicate a 1T4R configuration. The resource configuration 405 may include two SRS resource sets each with four SRS resources, where each SRS resource corresponds to its own antenna port on the UE 115-*a*. For example, the SRS Resource Set #1 may include SRS Resource #0, SRS Resource #1, SRS Resource #2, and SRS Resource #3, which may correspond to the antenna ports (APs) $AP_0$, $AP_1$, $AP_2$, and $AP_3$, respectively, and the SRS Resource Set #2 may include SRS Resource #4, SRS Resource #5, SRS Resource #6, and SRS Resource #7, which may correspond to the antenna ports $AP_4$, $AP_5$, $AP_6$, and $AP_7$, respectively. To switch from the 1T8R configuration to the 1T4R configuration, the UE 115-*a* may turn off (e.g., deactivate) four of the SRS resources and their corresponding antenna ports. For example, the UE 115-*a* may follow a first option and turn off the SRS Resource Set #2 and its corresponding SRS resource sets. The UE 115-*a* may then use the resource configuration 410 which may include the SRS Resource Set #1, and its corresponding SRS resources and antenna ports (e.g., SRS Resource #0, SRS Resource #1, SRS Resource #2, and SRS Resource #3, which may correspond to $AP_0$, $AP_1$, $AP_2$, and $AP_3$, respectively). In some cases, the UE 115-*a* may follow a second option and turn off some of the SRS resources within each set. The UE 115-*a* may use the resource configuration 415 which may include two SRS resource sets each with two SRS resources and their corresponding antenna ports. For example, the resource configuration 415 may include SRS Resource Set #1 with SRS Resource #0 and SRS Resource #1, and corresponding antenna ports $AP_0$ and $AP_1$, and may also include Resource Set #2 with SRS Resource #4 and SRS Resource #5, and corresponding antenna ports $AP_4$ and $AP_5$.

In some examples, the UE 115-*a* may deactivate (e.g., downgrade) SRS resource sets and SRS resources. The UE 115-*a* may use a rule to determine which SRS resources may be kept (e.g., activated) and which may be deactivated. In some cases, the UE 115-*a* may use a rule in which the first number N or the last N SRS resources sets or SRS resources may be deactivated based on SRS resource set ID and SRS resource ID. In some cases, the UE 115-*a* may keep SRS resources that may be shared with codebook usage (e.g., mapped to uplink transmit chains for physical uplink shared channel (PUSCH)). In some cases, the UE 115-*a* may keep the default SRS resource sets and SRS resources. In some cases, the rule may indicate to the UE 115-*a* which SRS resource sets and SRS resources may be activated and deactivated, but may not enforce which antenna ports the UE 115-*a* may sound. For example, in the 1T8R configuration as described herein, the base station 105-*a* may indicate to the UE 115-*a* that the UE 115-*a* may only sound four of the eight antenna ports. The UE 115-*a* may determine which four of the eight antenna ports (e.g., and corresponding SRS resources) to sound. As such, the mapping between the SRS resources and the antenna ports may be determined by the UE 115-*a*.

Figure 5:
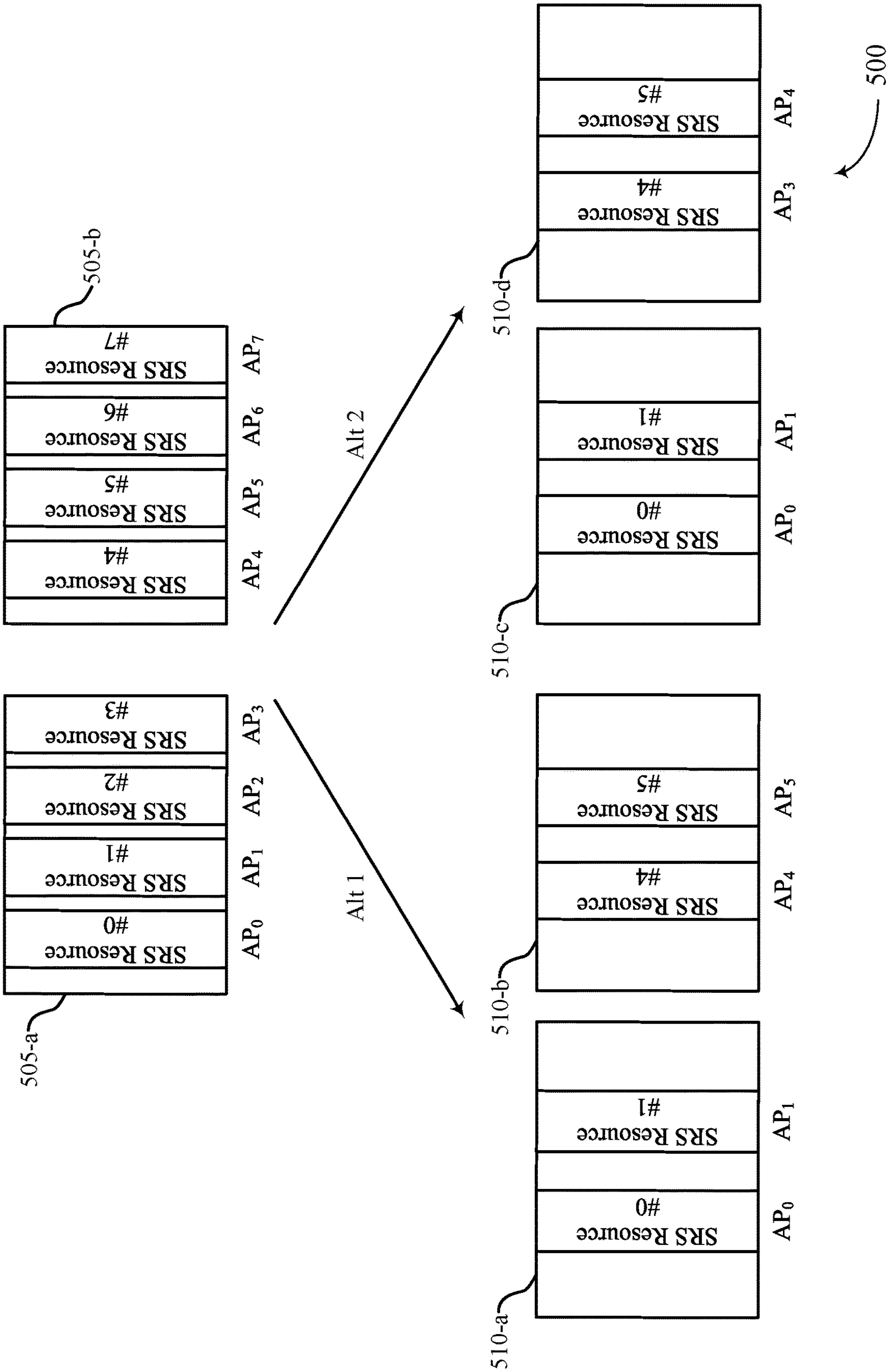
FIG. 5 illustrates an example of an antenna port map that supports adaptive antenna switching and resource configuration within a BWP in accordance with aspects of the present disclosure.

FIG. 5 illustrates an example of an antenna port map 500 that supports adaptive antenna switching and resource configuration within a BWP in accordance with aspects of the present disclosure. In some examples, the resource configuration 500 may implement or be implemented by aspects of wireless communications system 100, for example a UE 115-*a* and a base station 105-*a* as described with reference to FIGS. 1 and 2.

In some examples, the UE 115-*a* may use antenna port mapping to reduce the number of active SRS resource sets and SRS resources. The UE 115-*a* may be configured with eight SRS resources and corresponding antenna ports, such SRS Resources #0-#7 and the antenna ports $AP_0$-$AP_7$, respectively, in the SRS resource set 505-*a* and the SRS resource set 505-*b*. In some cases, to reduce the SRS resource sets, the UE 115-*a* may autonomously map antenna ports based on a reference signal received power (RSRP), a received signal strength indicator (RSSI), a signal to interference and noise ratio (SINR), and a spectral efficiency (SE) from the receive antenna ports (e.g., based on a channel state information reference signal (CSI-RS)).

In some cases, the UE 115-*a* may reduce the resource set 505-*a* into two SRS resource sets with two SRS resources in each (e.g., Alt 1). For example, the UE 115-*a* may reduce the SRS resources to the SRS resource set 510-*a* including SRS Resource #0 and SRS Resource #1 with corresponding antenna ports $AP_0$ and $AP_1$, and to the SRS resource set 510-*b* including SRS Resource #4 and SRS Resource #5 with corresponding antenna ports $AP_4$ and $AP_5$. In some cases, the UE 115-*a* may follow previous port mapping before receiving a deactivation command (e.g., Alt 2). For example, the UE 115-*a* may reduce the SRS resources to the SRS resource set 510-*c* including SRS Resource #0 and SRS Resource #1 with corresponding antenna ports $AP_0$ and $AP_1$, and to the SRS resource set 510-*d* including SRS Resource #4 and SRS Resource #5 with corresponding antenna ports $AP_3$ and $AP_4$.

Figure 6:
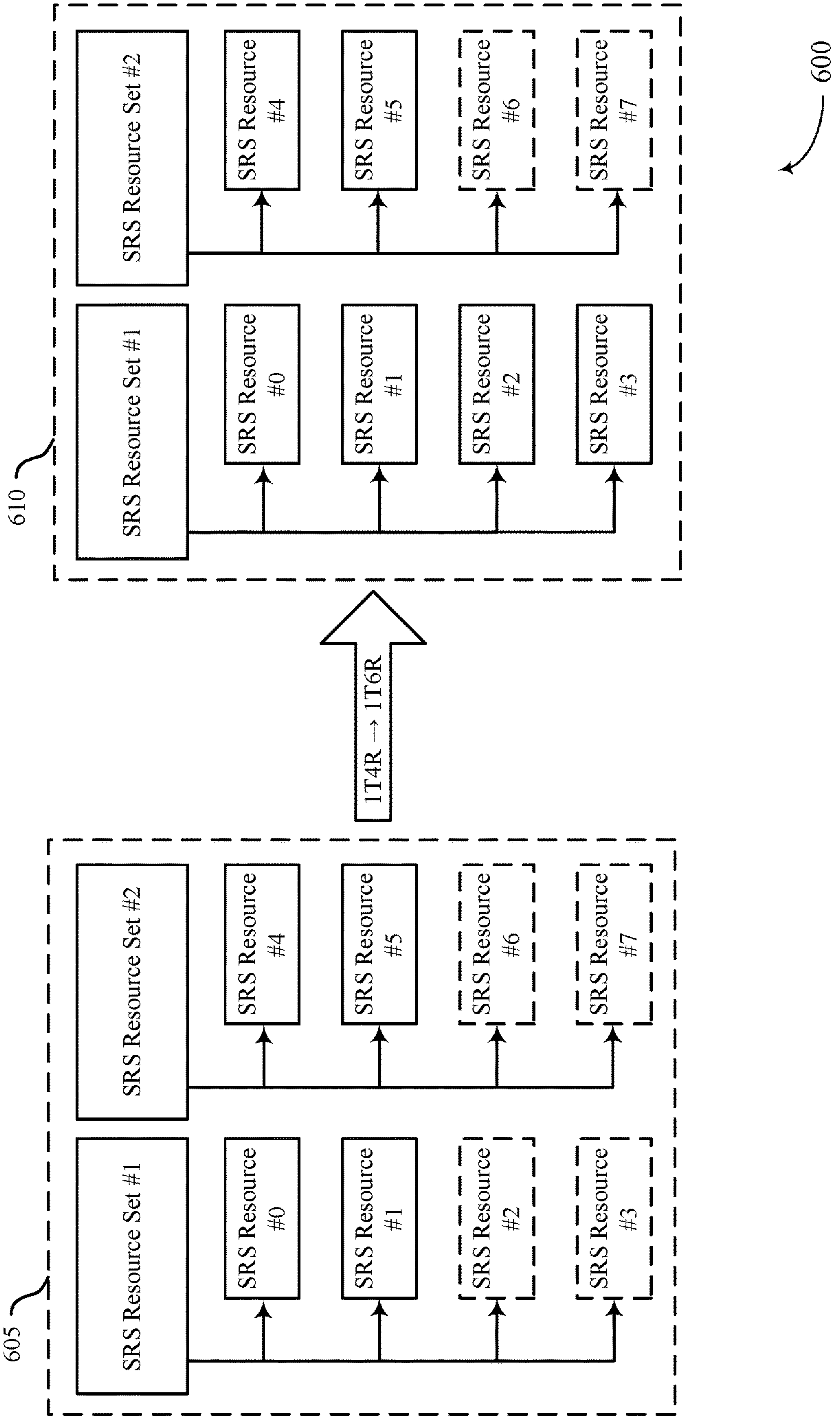
FIG. 6 illustrates an example of a resource configuration that supports adaptive antenna switching and resource configuration within a BWP in accordance with aspects of the present disclosure.

FIG. 6 illustrates an example of a resource configuration 600 that supports adaptive antenna switching and resource configuration within a BWP in accordance with aspects of the present disclosure. In some examples, the resource configuration 600 may implement or be implemented by aspects of wireless communications system 100, for example a UE 115 and a base station 105 as described with reference to FIGS. 1 and 2.

In some cases, the UE 115-*a* may be configured with a 1T8R resource configuration 605 that may include two SRS resource sets each with four SRS resources, where each resource corresponds to its own antenna port. For example, the SRS Resource Set #1 may include SRS Resource #0, SRS Resource #1, SRS Resource #2, and SRS Resource #3, and the SRS Resource Set #2 may include SRS Resource #4, SRS Resource #5, SRS Resource #6, and SRS Resource #7. In some cases, the base station 105-*a* may transmit an indication to the UE 115-*a* to switch the resource configuration 605 from a 1T8R configuration to a 1T4R configuration, such that the UE 115-*a* may deactivate the SRS Resource #2 and the SRS Resource #3 in the SRS Resource Set #1, and the SRS Resource #6 and the SRS Resource #7 in the SRS Resource Set #2.

In some examples, the UE 115-*a* may define a rule to determine which SRS resources may be re-activated among the set of deactivated SRS resource sets and SRS resources. In some cases, the UE 115-*a* may determine to re-activate the first number N of the last N SRS resource sets or SRS resources based on SRS resource set ID and SRS resource ID. In some cases, the UE 115-*a* may reactivate SRS resource sets and SRS resources based on an indication (e.g., an SRI) and a configured RRC table, for example as described with reference to Table 2 and FIG. 3. For example, after receiving an indication from the base station 105-*a* to switch to a 1T4R configuration, the UE 115-*a* may reactivate the SRS Resource #2 and the SRS Resource #3 in the SRS Resource Set #1 and arrive at the resource configuration 610, which may be a 1T6R configuration. As such, the resource configuration 610 may include the SRS Resource Set #1 with SRS Resource #0, SRS Resource #1, SRS Resource #2, and SRS Resource #3, and the SRS Resource Set #2 may include SRS Resource #4, and SRS Resource #5.

Figure 7:
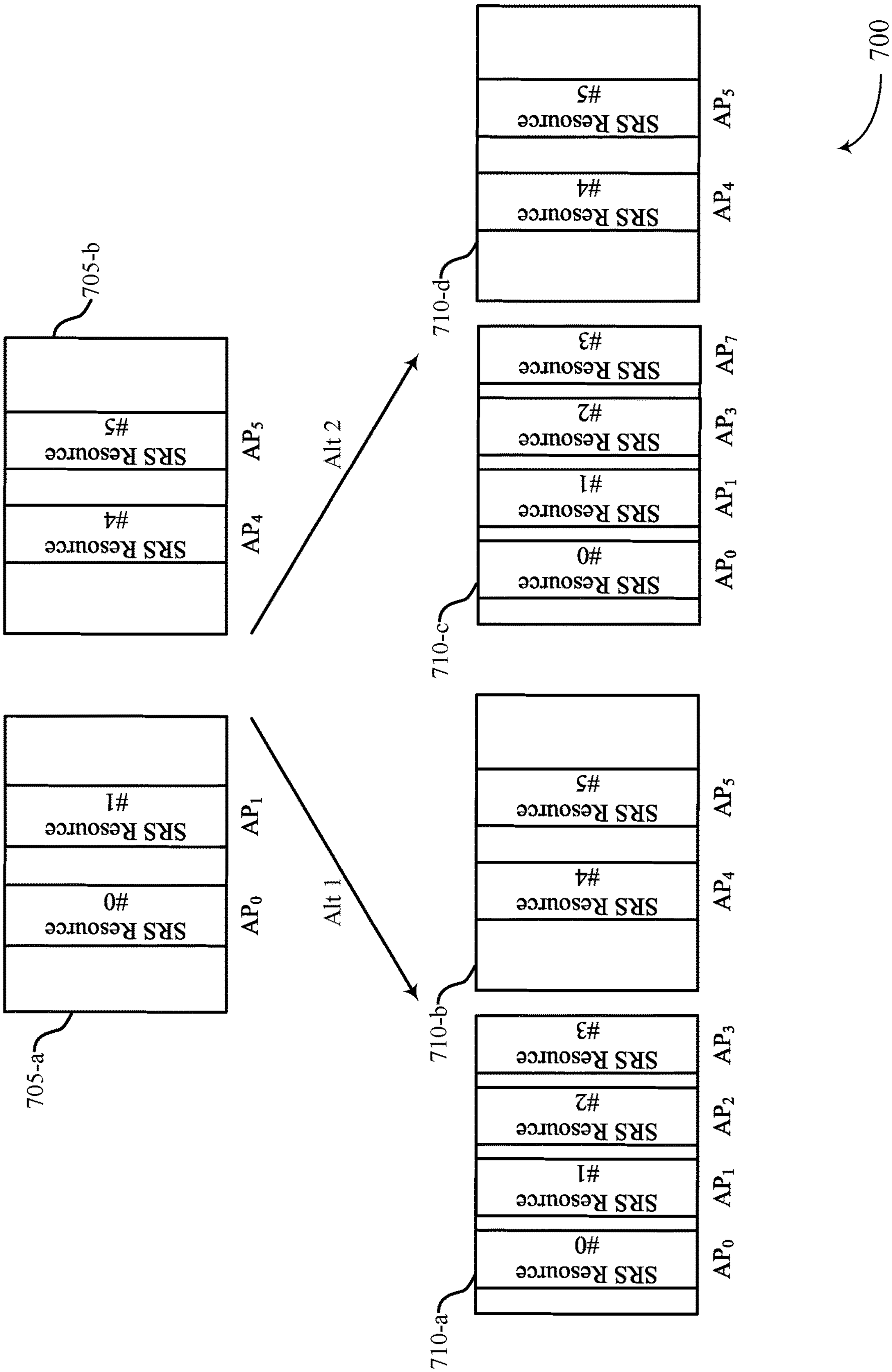
FIG. 7 illustrates an example of an antenna port map that supports adaptive antenna switching and resource configuration within a BWP in accordance with aspects of the present disclosure.

FIG. 7 illustrates an example of an antenna port map 700 that supports adaptive antenna switching and resource configuration within a BWP in accordance with aspects of the present disclosure. In some examples, the antenna port mapping 700 may implement or be implemented by aspects of wireless communications system 100, for example a UE 115 and a base station 105 as described with reference to FIGS. 1 and 2.

In some cases, the UE 115-*a* may use antenna port mapping of reactivated SRS resource sets and SRS resources. In some cases (e.g., Alt 1), the UE 115-*a* may autonomously map antenna ports based on an RSRP, an RSSI, a SINR, and an SE from the receive antenna ports (e.g., based on CSI-RS). For example, the UE 115-*a* may be configured with four SRS resources and their corresponding antenna ports, such as SRS Resource #0 and SRS Resource #1 with corresponding antenna ports $AP_0$ and $AP_1$ in the resource set 705-*a*, and SRS Resource #4 and SRS Resource #5 with corresponding antenna ports $AP_4$ and $AP_5$ in the resource set 705-*b*. In some cases, to gain two more SRS resources, the UE 115-*a* may map the SRS resources and antenna ports such that the SRS Resources #0-#5 correspond to the antenna ports $AP_0$-$AP_5$ respectively in the resource set 710-*a* and the resource set 710-*b*. In some cases, to gain two more SRS resources, the UE 115-*a* may use the previous port mapping (e.g., Alt 2) such that the SRS resources map to previous antenna ports in the resource set 710-*c* and the resource set 710-*d*. For example, SRS Resource #2 may map to antenna port $AP_3$ and SRS Resource #3 may map to antenna port $AP_7$. In some cases, the UE 115-*a* may use a different port mapping.

In some examples, the UE 115-*a* may use xT adaptation to determine which SRS resource sets and SRS resources to activate and deactivate. In some cases, the UE 115-*a* may adapt the number of transmit antennas via indication of a number of ports per SRS resource ID or SRS resource set. In some cases, the number of bits may depend on a configuration (e.g., 4 ports, 2 ports, 1 port equal 2 bits). In some cases, the UE 115-*a* may receive a bitmap (e.g., including 4 bits), where each bit may indicate the antenna port number. In some cases, different SRS resources may have different numbers of ports, and as such, the indication of the number of antenna ports may be on a per-SRS resource basis. In some cases, the antenna ports per SRS resource that the UE 115-*a* activates or deactivates may be based on a defined rule (e.g., as described with reference to FIG. 7) or based on a bitmap (e.g., including 4 bits) as described with reference to FIG. 3.

In some examples, the UE 115-*a* may be configured with a 4T8R resource configuration which may have 2 SRS resources, and each SRS resource may have 4 ports. For example, the SRS Resource #1 may have antenna ports $AP_0$, $AP_1$, $AP_2$, and $AP_3$, and the SRS Resource #2 may have antenna ports $AP_4$, $AP_5$, $AP_6$, and $AP_7$. The UE 115-*a* may receive a command from the base station 105-*a* to fall back to the 2T4R resource configuration, and as such, may deactivate 2 of the 4 ports to result in 2 SRS resources with 2 ports each. In some cases, the UE 115-*a* may select the antenna ports to deactivate autonomously. For example, the UE 115-*a* may deactivate $AP_1$ and $AP_2$, and may keep $AP_0$ and $AP_3$. In some cases, the UE 115-*a* may deactivate the first two antenna ports $AP_0$ and $AP_1$, and may keep the last two ports $AP_2$ and $AP_3$. In some cases, the base station 105-*a* may transmit a bitmap to the UE 115-*a* indicating which antenna ports to deactivate. For example, a bitmap 1001 may indicate for the UE 115-*a* to deactivate $AP_1$ and $AP_2$, and keep $AP_0$ and $AP_3$.

In some cases, when the UE 115-*a* either increases or decreases the number of used ports, the UE 115-*a* may maintain the same per-port transmission power (e.g., as the transmission power is divided evenly among the number of ports), or may increase the transmission power by x dB. For example, the total transmission power may be 23 dBm over 4 antenna ports, which may map to a per-port power of 17 dBm (e.g., ¼ linear equals 6 dB lower). In some cases, for a 2T2R configuration, the UE 115-*a* may maintain the 17 dBm per-port power, for a total transmission power of 20 dBm (e.g., which may be lower because of deactivated antenna ports). In some cases, the UE 115-*a* may increase the power per-port to 20 dBm, for a total transmit power of 23 dBm. In some cases, adjusting the transmission power may introduce new UE 115-*a* capability reporting.

In some examples, the UE 115-*a* may receive non-scheduling DCI that may repurpose bitfields to indicate a new SRS configuration. In some cases, the DCI may include an explicit indication of a bitmap of SRS resources across all SRS resource sets (e.g., for 8 bits). In some cases, the explicit indication may be an SRI indication to a pre-configured RRC table. In some cases, the DCI may include an implicit indication of xTyR and rules to select which SRS resource sets and SRS resources may be activated and deactivated. As such, DCI may be used instead of MAC-CE for the examples described herein with reference to FIGS. 2-7.

In some cases, the UE 115-*a* may report a UE capability indicating support of within BWP SRS configuration adaptation. In some cases, the UE 115-*a* may report a comb of SRS switching configurations that may be switchable. In some cases, the UE 115-*a* may report its capabilities using UE assisted information (UAI), which may be the preferred SRS switching mode configuration. The UAI may be indicated via a message similar to a scheduling request (SR).

Figure 8:
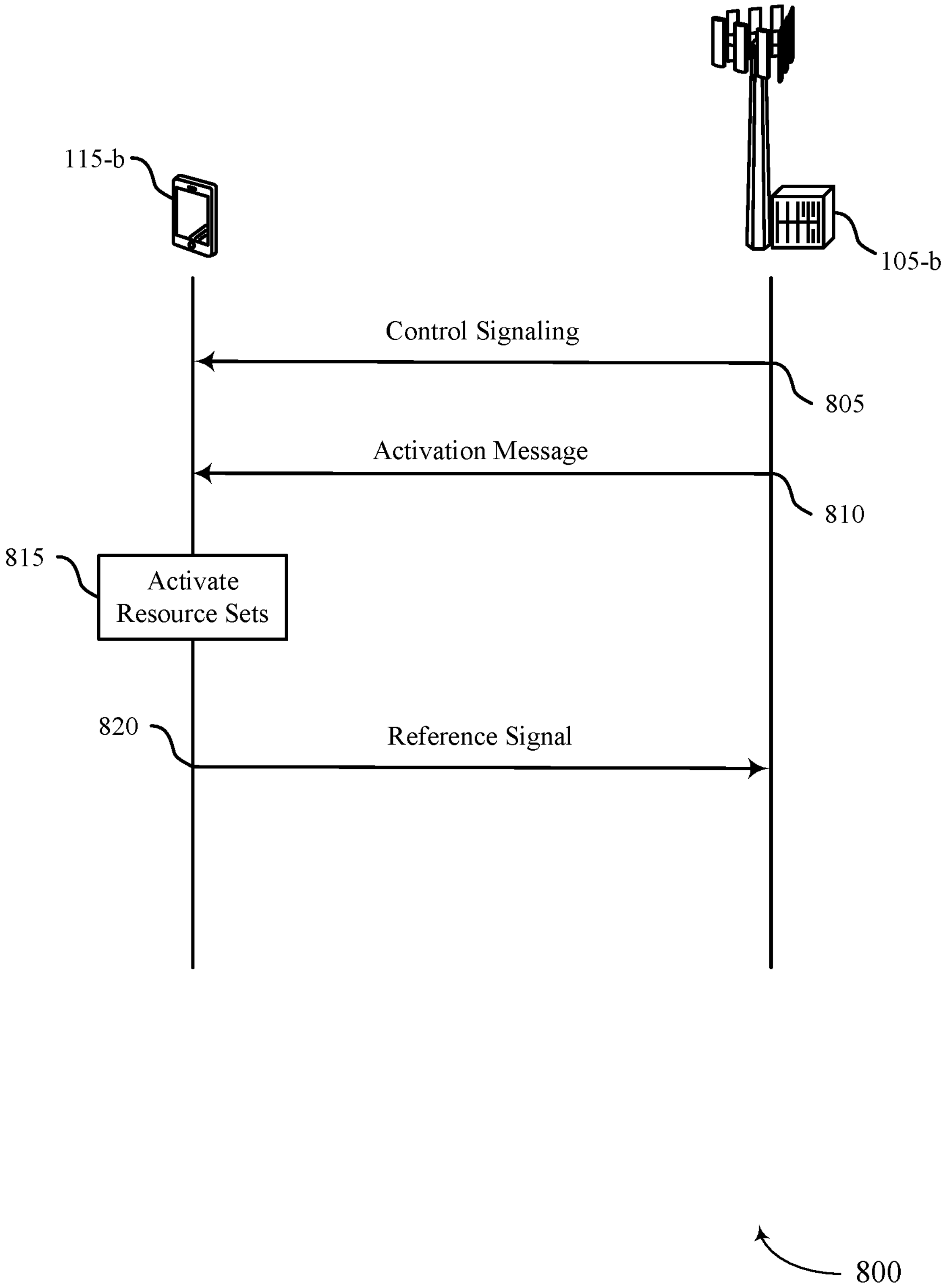
FIG. 8 illustrates an example of a process flow that supports adaptive antenna switching and resource configuration within a BWP in accordance with aspects of the present disclosure.

FIG. 8 illustrates an example of a process flow 800 that supports adaptive antenna switching and resource configuration within a BWP in accordance with aspects of the present disclosure. The process flow 800 may implement or be implemented by aspects of wireless communications system 100. For example, the process flow 800 may include a UE 115-*b* and a base station 105-*a*, which may be examples of a UE 115 and a base station 105, as described with reference to FIG. 1. In the following description of the process flow 800, the operations between the UE 115-*b* and the base station 105-*b* may be transmitted in a different order than the example order shown, or the operations performed by the UE 115-*b* and the base station 105-*b* may be performed in different orders or at different times. Some operations may also be omitted from the process flow 800, and other operations may be added to the process flow 800.

At 805, the UE 115-*b* may receive, from the base station 105-*b*, control signaling that indicates a configuration for use by the UE 115-*b* to select one or more resource sets for a BWP for the UE 115-*b*. In some cases, each of the resource sets may include reference signal resources (e.g., SRSs) that correspond to one or more antenna ports of the UE 115-*b*.

At 810, the UE 115-*b* may receive, from the base station 105-*b*, an activation message instructing the UE 115-*b* to activate at least one resource set for reference signal transmission using the BWP. In some cases, the activation message may include a bitmap that activates at least one resource set for reference signal transmission. In some examples, the activation message may include an SRI indicating that at least one resource set is activated for reference signal transmission.

At 815, the UE 115-*b* may activate at least one resource set for reference signal transmission using the BWP based on a set of rules that indicates respective reference signal resources to activate for each of the resource sets, a mapping between one or more antenna ports of the UE 115-*b* and reference signal resources for reference signal transmission using the BWP, or a combination thereof.

At 820, the UE 115-*b* may transmit, to the base station 105-*b*, a reference signal over the activated resource using the BWP and the antenna port corresponding to the activated resource set based on the activation message. In some cases, the UE 115-*b* may be configured to use a number of transmit antennas as well as a number of receive antennas. UE 115-*b* may use up to the number of transmit antennas to transmit signals and may use up to the number of receive antennas to receive signals.

Figure 9:
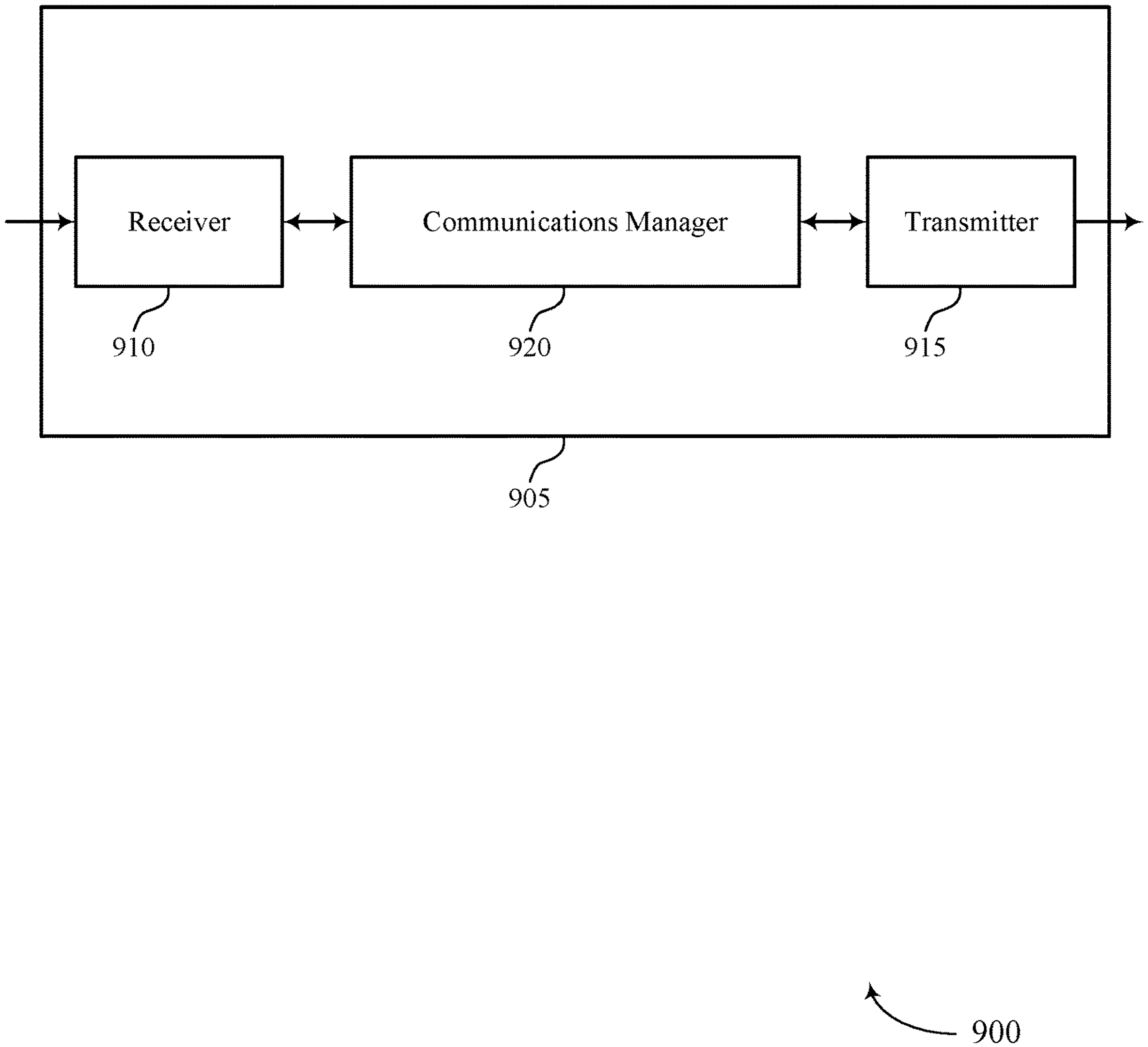
FIGS. 9 and 10 show block diagrams of devices that support adaptive antenna switching and resource configuration within a BWP in accordance with aspects of the present disclosure.

FIG. 9 shows a block diagram 900 of a device 905 that supports adaptive antenna switching and resource configuration within a BWP in accordance with aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to adaptive antenna switching and resource configuration within a BWP). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to adaptive antenna switching and resource configuration within a BWP). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of adaptive antenna switching and resource configuration within a BWP as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a UE in accordance with examples as disclosed herein. For example, the communications manager 920 may be configured as or otherwise support a means for receiving, from a base station, a configuration indicating a set of multiple resource sets for a BWP for the UE, each of the set of multiple resource sets including reference signal resources that correspond to one or more antenna ports of the UE. The communications manager 920 may be configured as or otherwise support a means for receiving, from the base station, an activation message instructing the UE to activate at least one resource set of the set of multiple resource sets for reference signal transmission using the BWP. The communications manager 920 may be configured as or otherwise support a means for transmitting a reference signal over the activated at least one resource set using the BWP and at least one antenna port of the one or more antenna ports based on the activation message, the at least one antenna port corresponding to the activated at least one resource set.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for adaptive antenna switching and resource configuration within a BWP, which may improve resource efficiency and power savings and reduce signaling overhead, among other advantages. As such, supported techniques may include improved network operations and, in some examples, may promote network efficiencies, among other benefits.

Figure 10:
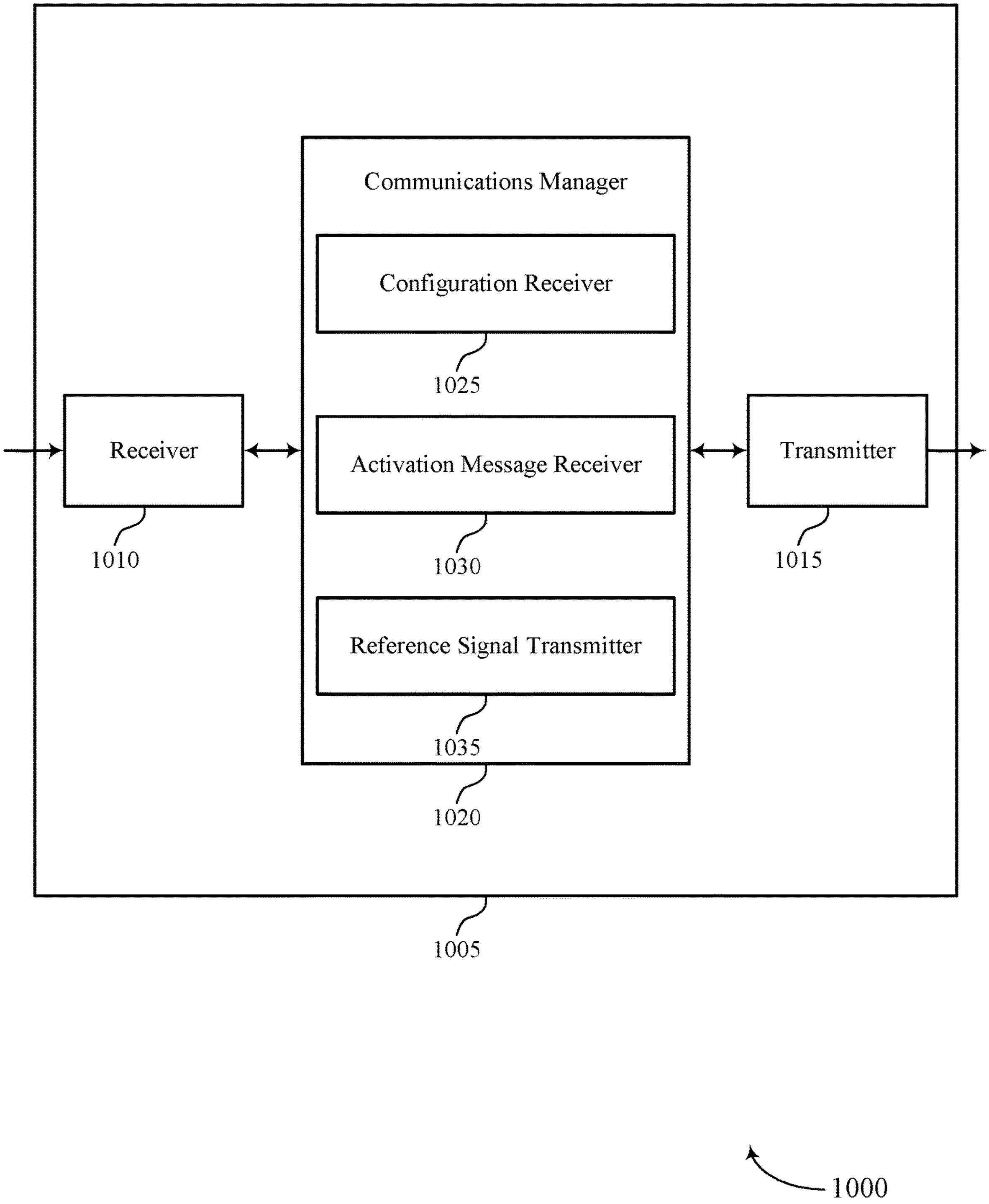

FIG. 10 shows a block diagram 1000 of a device 1005 that supports adaptive antenna switching and resource configuration within a BWP in accordance with aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to adaptive antenna switching and resource configuration within a BWP). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to adaptive antenna switching and resource configuration within a BWP). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of adaptive antenna switching and resource configuration within a BWP as described herein. For example, the communications manager 1020 may include a configuration receiver 1025, an activation message receiver 1030, a reference signal transmitter 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a UE in accordance with examples as disclosed herein. The configuration receiver 1025 may be configured as or otherwise support a means for receiving, from a base station, a configuration indicating a set of multiple resource sets for a BWP for the UE, each of the set of multiple resource sets including reference signal resources that correspond to one or more antenna ports of the UE. The activation message receiver 1030 may be configured as or otherwise support a means for receiving, from the base station, an activation message instructing the UE to activate at least one resource set of the set of multiple resource sets for reference signal transmission using the BWP. The reference signal transmitter 1035 may be configured as or otherwise support a means for transmitting a reference signal over the activated at least one resource set using the BWP and at least one antenna port of the one or more antenna ports based on the activation message, the at least one antenna port corresponding to the activated at least one resource set.

Figure 11:
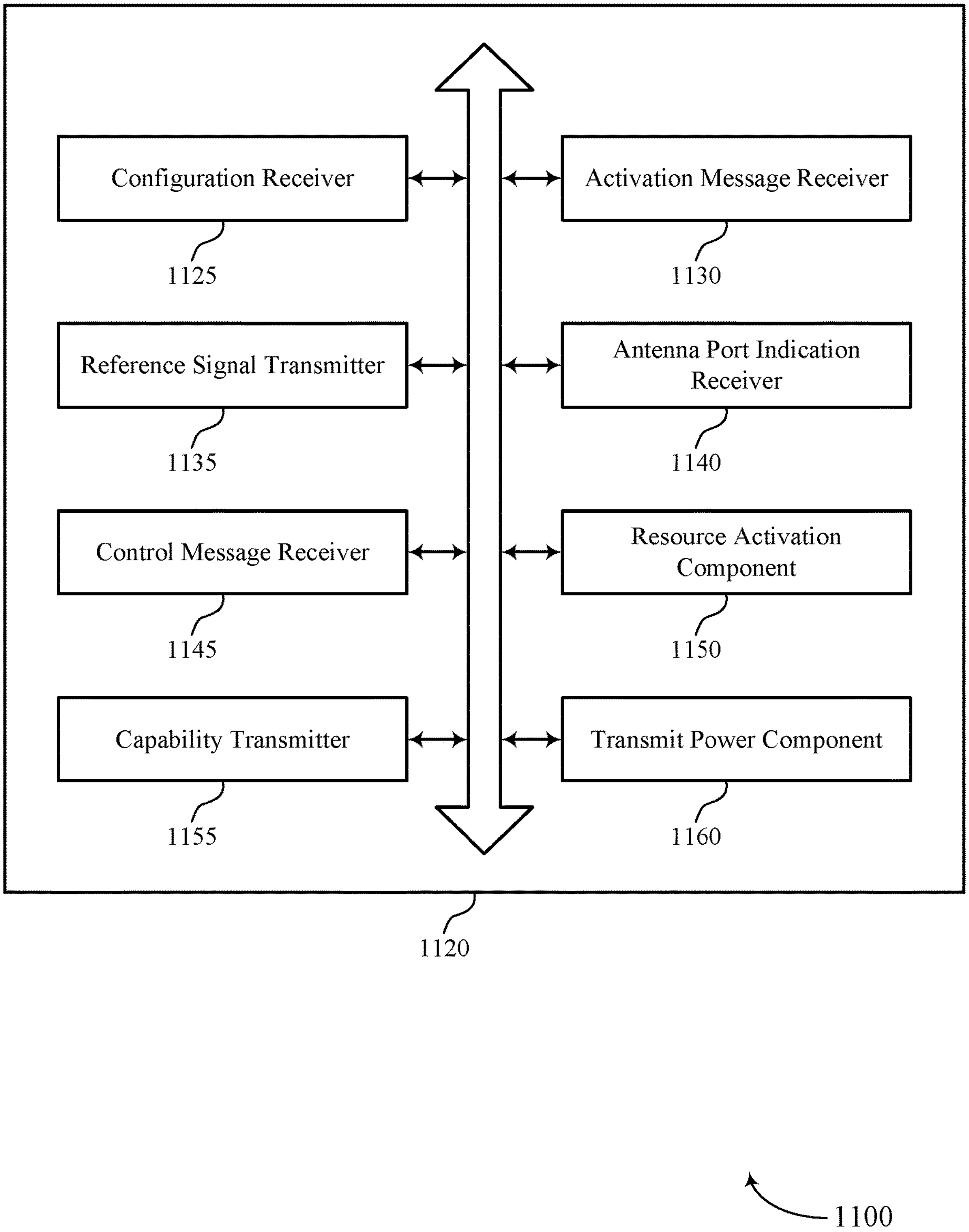
FIG. 11 shows a block diagram of a communications manager that supports adaptive antenna switching and resource configuration within a BWP in accordance with aspects of the present disclosure.

FIG. 11 shows a block diagram 1100 of a communications manager 1120 that supports adaptive antenna switching and resource configuration within a BWP in accordance with aspects of the present disclosure. The communications manager 1120 may be an example of aspects of a communications manager 920, a communications manager 1020, or both, as described herein. The communications manager 1120, or various components thereof, may be an example of means for performing various aspects of adaptive antenna switching and resource configuration within a BWP as described herein. For example, the communications manager 1120 may include a configuration receiver 1125, an activation message receiver 1130, a reference signal transmitter 1135, an antenna port indication receiver 1140, a control message receiver 1145, a resource activation component 1150, a capability transmitter 1155, a transmit power component 1160, or any combination thereof. Each of these components may communicate, directly or indirectly, with one another (e.g., via one or more buses).

The communications manager 1120 may support wireless communications at a UE in accordance with examples as disclosed herein. The configuration receiver 1125 may be configured as or otherwise support a means for receiving, from a base station, a configuration indicating a set of multiple resource sets for a BWP for the UE, each of the set of multiple resource sets including reference signal resources that correspond to one or more antenna ports of the UE. The activation message receiver 1130 may be configured as or otherwise support a means for receiving, from the base station, an activation message instructing the UE to activate at least one resource set of the set of multiple resource sets for reference signal transmission using the BWP. The reference signal transmitter 1135 may be configured as or otherwise support a means for transmitting a reference signal over the activated at least one resource set using the BWP and at least one antenna port of the one or more antenna ports based on the activation message, the at least one antenna port corresponding to the activated at least one resource set.

In some examples, to support receiving the activation message instructing the UE to activate the at least one resource set of the set of multiple resource sets, the activation message receiver 1130 may be configured as or otherwise support a means for receiving a bitmap that activates the at least one resource set of the set of multiple resource sets for reference signal transmission using the BWP, where each bit in the bitmap corresponds to a reference signal resource in the activated at least one resource set.

In some examples, to support receiving the activation message instructing the UE to activate the at least one resource set of the set of multiple resource sets, the activation message receiver 1130 may be configured as or otherwise support a means for receiving a bitmap that activates the at least one resource set of the set of multiple resource sets for reference signal transmission using the BWP, where all reference signal resources in the activated at least one resource set are activated.

In some examples, to support receiving the activation message instructing the UE to activate the at least one resource set of the set of multiple resource sets, the activation message receiver 1130 may be configured as or otherwise support a means for receiving a sounding reference signal resource indicator including an indication that the at least one resource set of the set of multiple resource sets is activated for reference signal transmission using the BWP.

In some examples, the antenna port indication receiver 1140 may be configured as or otherwise support a means for receiving an indication of a number of transmit antenna ports for activation at the UE, a number of receive antenna ports for activation at the UE, or a combination thereof.

In some examples, the control message receiver 1145 may be configured as or otherwise support a means for receiving a control message indicating a reference signal switching mode for activation at the UE for reference signal transmission using the BWP.

In some examples, the resource activation component 1150 may be configured as or otherwise support a means for activating the at least one resource set of the set of multiple resource sets for reference signal transmission using the BWP based on a set of rules that indicates respective reference signal resources to activate for each of the set of multiple resource sets, a mapping between one or more antenna ports of the UE and reference signal resources for reference signal transmission using the BWP, or a combination thereof.

In some examples, to support receiving the activation message instructing the UE to activate the at least one resource set of the set of multiple resource sets, the activation message receiver 1130 may be configured as or otherwise support a means for receiving an indication to activate a number of resource sets of the set of multiple resource sets, a number of reference signal resources of a set of multiple reference signal resources per resource set, or a combination thereof, for reference signal transmission using the BWP.

In some examples, the activation message receiver 1130 may be configured as or otherwise support a means for receiving a second activation message instructing the UE to deactivate one or more resource sets of the set of multiple resource sets. In some examples, the resource activation component 1150 may be configured as or otherwise support a means for deactivating the one or more resource sets of the set of multiple resource sets.

In some examples, a first set of reference signal resources is activated and a second set of reference signal resources is deactivated according to an activation rule based on the second activation message, the activation rule indicating activation of reference signal resources based on a reference signal resource ID, a resource set ID, a codebook usage, a default set of reference signal resources, a default set of resource sets, a signal measurement of one or more antenna ports of the UE, a previous antenna port configuration, or any combination thereof.

In some examples, the activation message receiver 1130 may be configured as or otherwise support a means for receiving a second activation message instructing the UE to reactivate one or more deactivated resources according to a reactivation rule, where the reactivation rule is based on a reference signal resource identifier (ID), a resource set ID, a lookup table, or any combination thereof.

In some examples, to support receiving the activation message instructing the UE to activate the at least one resource set of the set of multiple resource sets, the activation message receiver 1130 may be configured as or otherwise support a means for determining to reactivate the at least one resource set of a set of multiple deactivated resource sets, at least one reference signal resource of a set of multiple deactivated reference signal resources per resource set, or a combination thereof, for reference signal transmission using the BWP based on an antenna port mapping configuration for the UE.

In some examples, the antenna port indication receiver 1140 may be configured as or otherwise support a means for receiving an indication of a number of antenna ports of the UE per resource set or per reference signal resource to use for reference signal transmission using the BWP, where the indication includes a set of bits indicating an antenna port configuration for the UE, a bitmap indicating which of the number of antenna ports of the UE to use for reference signal transmission, an activation rule, or any combination thereof.

In some examples, the transmit power component 1160 may be configured as or otherwise support a means for selecting a transmit power per antenna port for reference signal transmission based on the number of antenna ports.

In some examples, to support receiving the activation message instructing the UE to activate the at least one resource set of the set of multiple resource sets, the activation message receiver 1130 may be configured as or otherwise support a means for receiving DCI that includes an SRS configuration instructing the UE to activate the at least one resource set of the set of multiple resource sets for reference signal transmission using the BWP.

In some examples, the capability transmitter 1155 may be configured as or otherwise support a means for transmitting an indication of a capability of the UE to support the set of multiple resource sets for the BWP, each of the set of multiple resource sets including reference signal resources that correspond to one or more antenna ports of the UE. In some examples, the capability transmitter 1155 may be configured as or otherwise support a means for transmitting an indication of a capability of the UE to support a set of antenna configurations for antenna switching within the BWP, wherein transmitting an indication of a capability of the UE comprises transmitting UE assistance information or uplink signaling indicating a UE preference for an antenna configuration of the set of antenna configurations.

Figure 12:
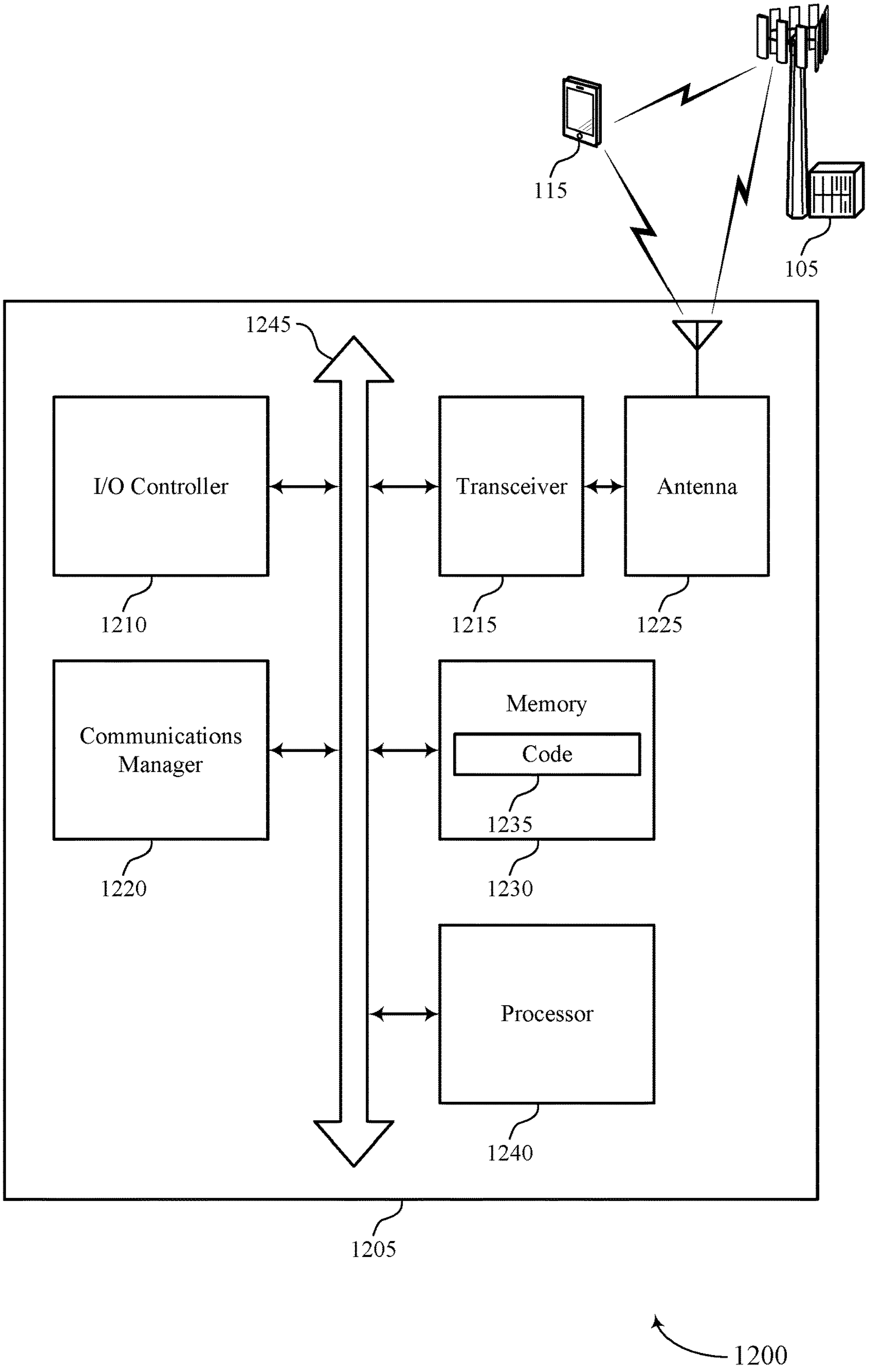
FIG. 12 shows a diagram of a system including a device that supports adaptive antenna switching and resource configuration within a BWP in accordance with aspects of the present disclosure.

FIG. 12 shows a diagram of a system 1200 including a device 1205 that supports adaptive antenna switching and resource configuration within a BWP in accordance with aspects of the present disclosure. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting adaptive antenna switching and resource configuration within a BWP). For example, the device 1205 or a component of the device 1205 may include a processor 1240 and memory 1230 coupled to the processor 1240, the processor 1240 and memory 1230 configured to perform various functions described herein.

The communications manager 1220 may support wireless communications at a UE in accordance with examples as disclosed herein. For example, the communications manager 1220 may be configured as or otherwise support a means for receiving, from a base station, a configuration indicating a set of multiple resource sets for a BWP for the UE, each of the set of multiple resource sets including reference signal resources that correspond to one or more antenna ports of the UE. The communications manager 1220 may be configured as or otherwise support a means for receiving, from the base station, an activation message instructing the UE to activate at least one resource set of the set of multiple resource sets for reference signal transmission using the BWP. The communications manager 1220 may be configured as or otherwise support a means for transmitting a reference signal over the activated at least one resource set using the BWP and at least one antenna port of the one or more antenna ports based on the activation message, the at least one antenna port corresponding to the activated at least one resource set.

By including or configuring the communications manager 1220 in accordance with examples as described herein, the device 1205 may support techniques for adaptive antenna switching and resource configuration within a BWP which may improve resource efficiency and power savings and reduce signaling overhead, among other advantages. As such, supported techniques may include improved network operations and, in some examples, may promote network efficiencies, among other benefits.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of adaptive antenna switching and resource configuration within a BWP as described herein, or the processor 1240 and the memory 1230 may be otherwise configured to perform or support such operations.

Figure 13:
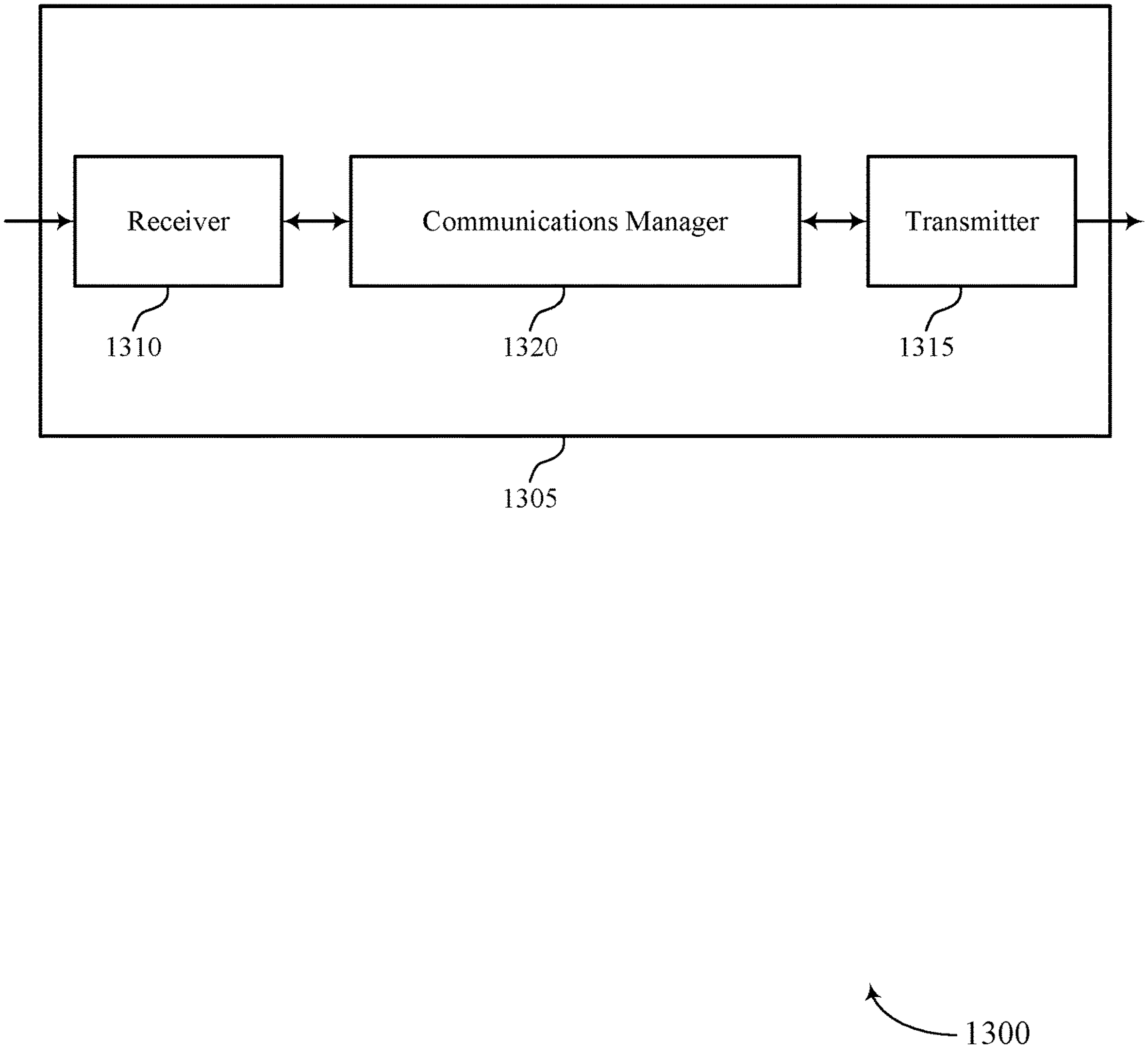
FIGS. 13 and 14 show block diagrams of devices that support adaptive antenna switching and resource configuration within a BWP in accordance with aspects of the present disclosure.

FIG. 13 shows a block diagram 1300 of a device 1305 that supports adaptive antenna switching and resource configuration within a BWP in accordance with aspects of the present disclosure. The device 1305 may be an example of aspects of a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to adaptive antenna switching and resource configuration within a BWP). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to adaptive antenna switching and resource configuration within a BWP). In some examples, the transmitter 1315 may be co-located with a receiver 1310 in a transceiver module. The transmitter 1315 may utilize a single antenna or a set of multiple antennas.

The communications manager 1320, the receiver 1310, the transmitter 1315, or various combinations thereof or various components thereof may be examples of means for performing various aspects of adaptive antenna switching and resource configuration within a BWP as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1320 may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communications at a base station in accordance with examples as disclosed herein. For example, the communications manager 1320 may be configured as or otherwise support a means for transmitting, to a UE, a configuration indicating a set of multiple resource sets for a BWP for the UE, each of the set of multiple resource sets including reference signal resources that correspond to one or more antenna ports of the UE. The communications manager 1320 may be configured as or otherwise support a means for transmitting, to the UE, an activation message instructing the UE to activate at least one resource set of the set of multiple resource sets for reference signal transmission using the BWP. The communications manager 1320 may be configured as or otherwise support a means for receiving a reference signal over the activated at least one resource set using the BWP and at least one antenna port of the one or more antenna ports based on the activation message, the at least one antenna port corresponding to the activated at least one resource set.

By including or configuring the communications manager 1320 in accordance with examples as described herein, the device 1305 (e.g., a processor controlling or otherwise coupled to the receiver 1310, the transmitter 1315, the communications manager 1320, or a combination thereof) may support techniques for adaptive antenna switching and resource configuration within a BWP which may improve resource efficiency and power savings and reduce signaling overhead, among other advantages. As such, supported techniques may include improved network operations and, in some examples, may promote network efficiencies, among other benefits.

Figure 14:
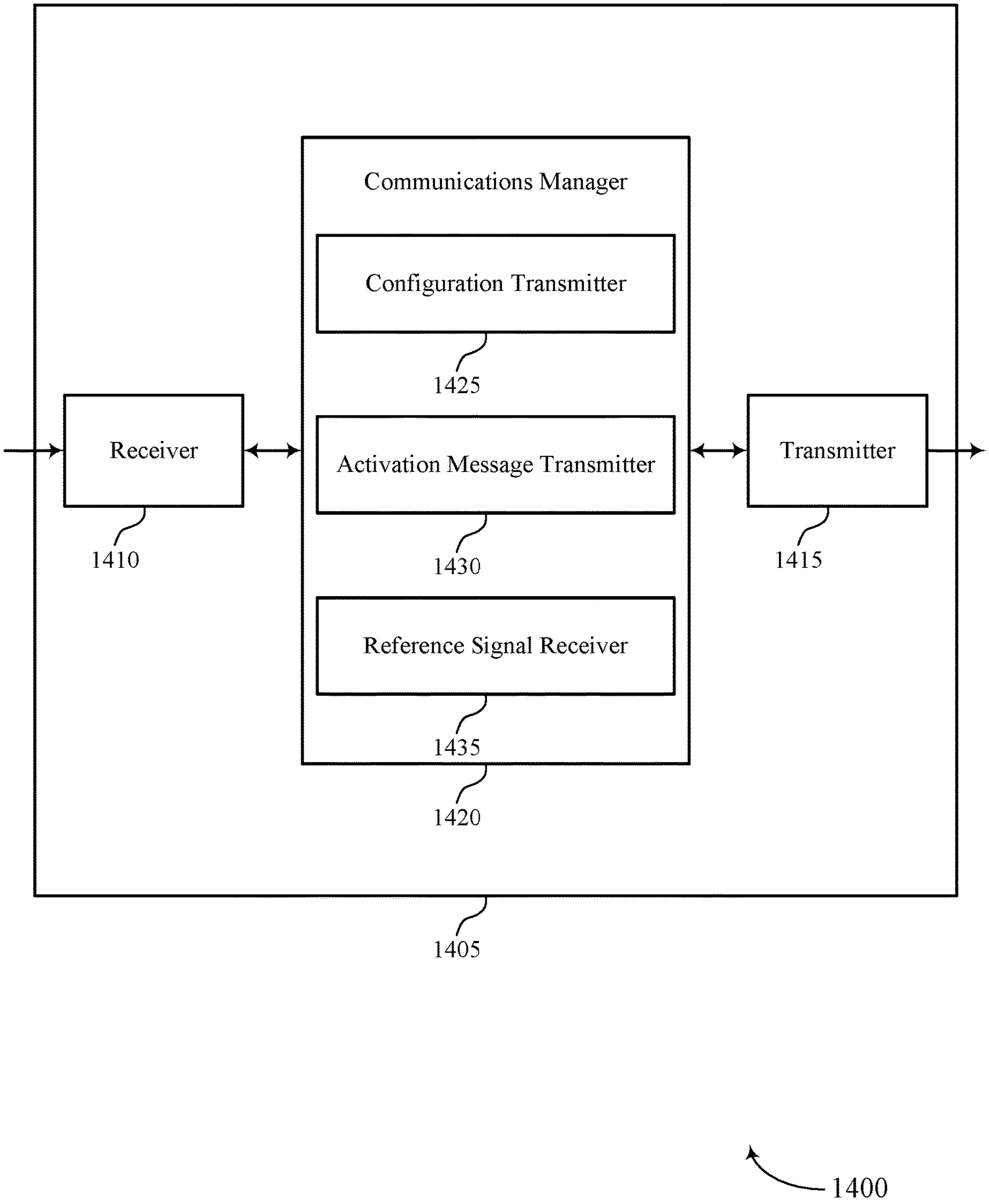

FIG. 14 shows a block diagram 1400 of a device 1405 that supports adaptive antenna switching and resource configuration within a BWP in accordance with aspects of the present disclosure. The device 1405 may be an example of aspects of a device 1305 or a base station 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to adaptive antenna switching and resource configuration within a BWP). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to adaptive antenna switching and resource configuration within a BWP). In some examples, the transmitter 1415 may be co-located with a receiver 1410 in a transceiver module. The transmitter 1415 may utilize a single antenna or a set of multiple antennas.

The device 1405, or various components thereof, may be an example of means for performing various aspects of adaptive antenna switching and resource configuration within a BWP as described herein. For example, the communications manager 1420 may include a configuration transmitter 1425, an activation message transmitter 1430, a reference signal receiver 1435, or any combination thereof. The communications manager 1420 may be an example of aspects of a communications manager 1320 as described herein. In some examples, the communications manager 1420, or various components thereof, may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communications at a base station in accordance with examples as disclosed herein. The configuration transmitter 1425 may be configured as or otherwise support a means for transmitting, to a UE, a configuration indicating a set of multiple resource sets for a BWP for the UE, each of the set of multiple resource sets including reference signal resources that correspond to one or more antenna ports of the UE. The activation message transmitter 1430 may be configured as or otherwise support a means for transmitting, to the UE, an activation message instructing the UE to activate at least one resource set of the set of multiple resource sets for reference signal transmission using the BWP. The reference signal receiver 1435 may be configured as or otherwise support a means for receiving a reference signal over the activated at least one resource set using the BWP and at least one antenna port of the one or more antenna ports based on the activation message, the at least one antenna port corresponding to the activated at least one resource set.

Figure 15:
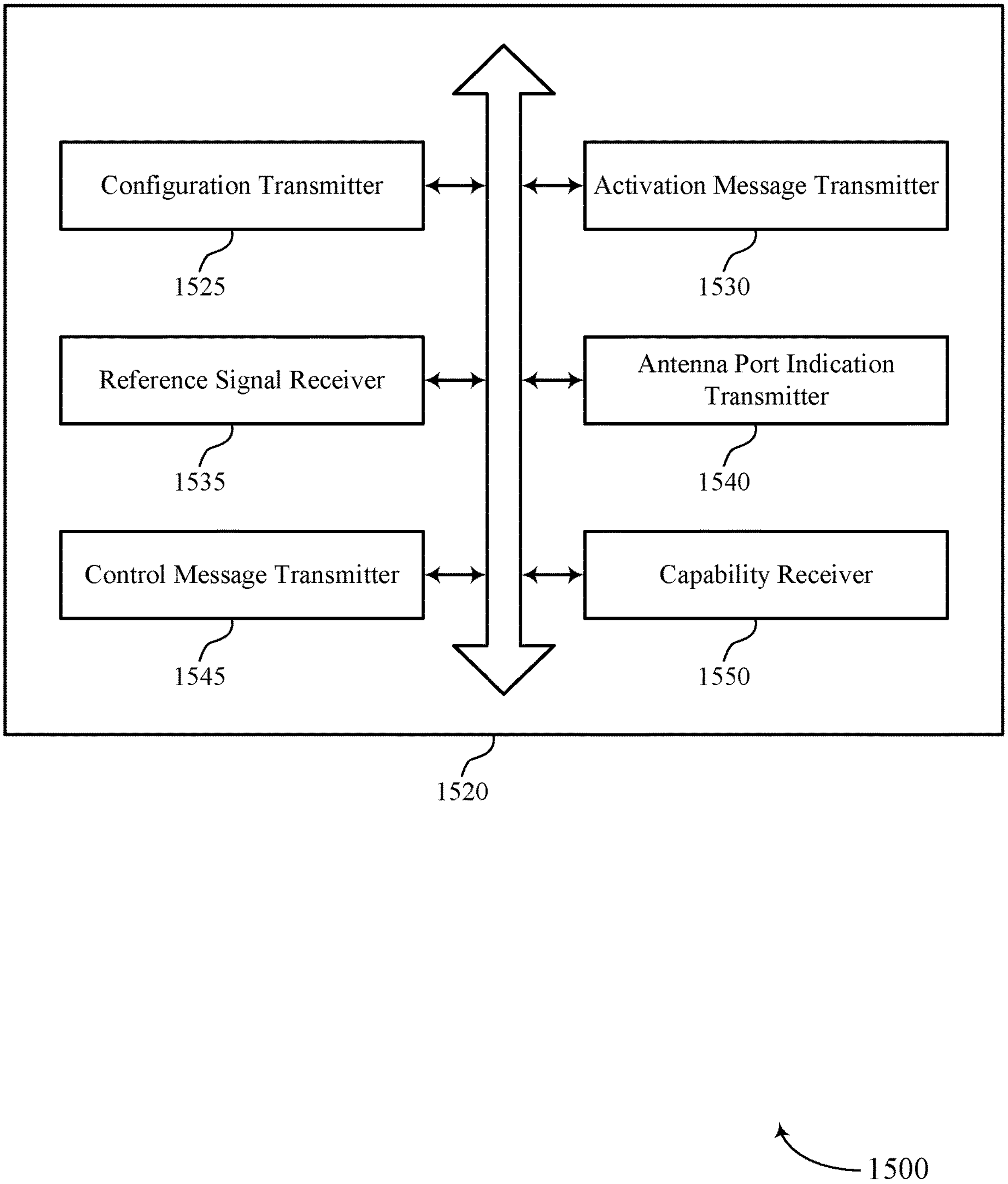
FIG. 15 shows a block diagram of a communications manager that supports adaptive antenna switching and resource configuration within a BWP in accordance with aspects of the present disclosure.

FIG. 15 shows a block diagram 1500 of a communications manager 1520 that supports adaptive antenna switching and resource configuration within a BWP in accordance with aspects of the present disclosure. The communications manager 1520 may be an example of aspects of a communications manager 1320, a communications manager 1420, or both, as described herein. The communications manager 1520, or various components thereof, may be an example of means for performing various aspects of adaptive antenna switching and resource configuration within a BWP as described herein. For example, the communications manager 1520 may include a configuration transmitter 1525, an activation message transmitter 1530, a reference signal receiver 1535, an antenna port indication transmitter 1540, a control message transmitter 1545, a capability receiver 1550, or any combination thereof. Each of these components may communicate, directly or indirectly, with one another (e.g., via one or more buses).

The communications manager 1520 may support wireless communications at a base station in accordance with examples as disclosed herein. The configuration transmitter 1525 may be configured as or otherwise support a means for transmitting, to a UE, a configuration indicating a set of multiple resource sets for a BWP for the UE, each of the set of multiple resource sets including reference signal resources that correspond to one or more antenna ports of the UE. The activation message transmitter 1530 may be configured as or otherwise support a means for transmitting, to the UE, an activation message instructing the UE to activate at least one resource set of the set of multiple resource sets for reference signal transmission using the BWP. The reference signal receiver 1535 may be configured as or otherwise support a means for receiving a reference signal over the activated at least one resource set using the BWP and at least one antenna port of the one or more antenna ports based on the activation message, the at least one antenna port corresponding to the activated at least one resource set.

In some examples, to support transmitting the activation message instructing the UE to activate the at least one resource set of the set of multiple resource sets, the activation message transmitter 1530 may be configured as or otherwise support a means for transmitting a bitmap that activates the at least one resource set of the set of multiple resource sets for reference signal transmission using the BWP, where each bit in the bitmap corresponds to a reference signal resource in the activated at least one resource set.

In some examples, to support transmitting the activation message instructing the UE to activate the at least one resource set of the set of multiple resource sets, the activation message transmitter 1530 may be configured as or otherwise support a means for transmitting a bitmap that activates the at least one resource set of the set of multiple resource sets for reference signal transmission using the BWP, where all reference signal resources in the activated at least one resource set are activated.

In some examples, to support transmitting the activation message instructing the UE to activate the at least one resource set of the set of multiple resource sets, the activation message transmitter 1530 may be configured as or otherwise support a means for transmitting an SRI including an indication that the at least one resource set of the set of multiple resource sets is activated for reference signal transmission using the BWP.

In some examples, the antenna port indication transmitter 1540 may be configured as or otherwise support a means for transmitting an indication of a number of transmit antenna ports for activation at the UE, a number of receive antenna ports for activation at the UE, or a combination thereof.

In some examples, the control message transmitter 1545 may be configured as or otherwise support a means for transmitting a control message indicating a reference signal switching mode for activation at the UE for reference signal transmission using the BWP.

In some examples, to support transmitting the activation message instructing the UE to activate the at least one resource set of the set of multiple resource sets, the activation message transmitter 1530 may be configured as or otherwise support a means for transmitting an indication to activate a number of resource sets of the set of multiple resource sets, a number of reference signal resources of a set of multiple reference signal resources per resource set, or a combination thereof, for reference signal transmission using the BWP.

In some examples, the activation message transmitter 1530 may be configured as or otherwise support a means for transmitting a second activation message instructing the UE to deactivate one or more resource sets of the set of multiple resource sets.

In some examples, the activation message transmitter 1530 may be configured as or otherwise support a means for transmitting a second activation message instructing the UE to reactivate one or more deactivated resource according to a reactivation rule, where the reactivation rule is based on a reference signal resource identifier (ID), a resource set ID, a lookup table, or any combination thereof.

In some examples, the antenna port indication transmitter 1540 may be configured as or otherwise support a means for transmitting an indication of a number of antenna ports of the UE per resource set or per reference signal resource to use for reference signal transmission using the BWP, where the indication includes a set of bits indicating an antenna port configuration for the UE, a bitmap indicating which of the number of antenna ports of the UE to use for reference signal transmission, an activation rule, or any combination thereof.

In some examples, to support transmitting the activation message instructing the UE to activate the at least one resource set of the set of multiple resource sets, the activation message transmitter 1530 may be configured as or otherwise support a means for transmitting DCI that includes an SRS configuration instructing the UE to activate the at least one resource set of the set of multiple resource sets for reference signal transmission using the BWP.

In some examples, the capability receiver 1550 may be configured as or otherwise support a means for receiving an indication of a capability of the UE to support the set of multiple resource sets for the BWP, each of the set of multiple resource sets including reference signal resources that correspond to one or more antenna ports of the UE. In some examples, the capability receiver 1550 may be configured as or otherwise support a means for receiving an indication of a capability of the UE to support a set of antenna configurations for antenna switching within the BWP, wherein receiving an indication of a capability of the UE comprises receiving UE assistance information or uplink signaling indicating a UE preference for an antenna configuration of the set of antenna configurations.

Figure 16:
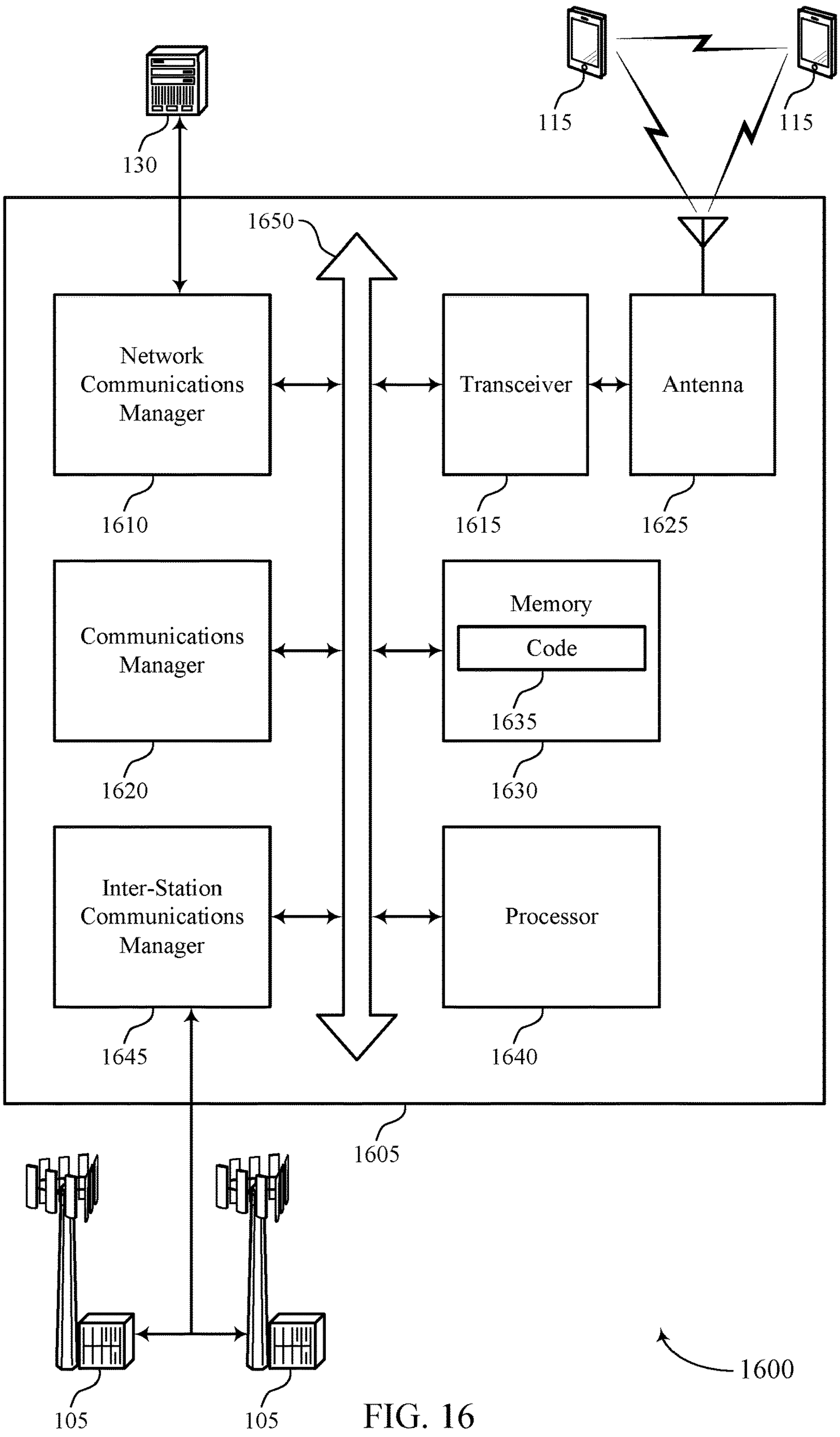
FIG. 16 shows a diagram of a system including a device that supports adaptive antenna switching and resource configuration within a BWP in accordance with aspects of the present disclosure.

FIG. 16 shows a diagram of a system 1600 including a device 1605 that supports adaptive antenna switching and resource configuration within a BWP in accordance with aspects of the present disclosure. The device 1605 may be an example of or include the components of a device 1305, a device 1405, or a base station 105 as described herein. The device 1605 may communicate wirelessly with one or more base stations 105, UEs 115, or any combination thereof. The device 1605 may include components for bi-directional voice and data communications including components for transmitting and receiving communications, such as a communications manager 1620, a network communications manager 1610, a transceiver 1615, an antenna 1625, a memory 1630, code 1635, a processor 1640, and an inter-station communications manager 1645. These components may be in electronic communication or otherwise coupled (e.g., operatively, communicatively, functionally, electronically, electrically) via one or more buses (e.g., a bus 1650).

The network communications manager 1610 may manage communications with a core network 130 (e.g., via one or more wired backhaul links). For example, the network communications manager 1610 may manage the transfer of data communications for client devices, such as one or more UEs 115.

In some cases, the device 1605 may include a single antenna 1625. However, in some other cases the device 1605 may have more than one antenna 1625, which may be capable of concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 may also include a modem to modulate the packets, to provide the modulated packets to one or more antennas 1625 for transmission, and to demodulate packets received from the one or more antennas 1625. The transceiver 1615, or the transceiver 1615 and one or more antennas 1625, may be an example of a transmitter 1315, a transmitter 1415, a receiver 1310, a receiver 1410, or any combination thereof or component thereof, as described herein.

The memory 1630 may include RAM and ROM. The memory 1630 may store computer-readable, computer-executable code 1635 including instructions that, when executed by the processor 1640, cause the device 1605 to perform various functions described herein. The code 1635 may be stored in a non-transitory computer-readable medium such as system memory or another type of memory. In some cases, the code 1635 may not be directly executable by the processor 1640 but may cause a computer (e.g., when compiled and executed) to perform functions described herein. In some cases, the memory 1630 may contain, among other things, a BIOS which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting adaptive antenna switching and resource configuration within a BWP). For example, the device 1605 or a component of the device 1605 may include a processor 1640 and memory 1630 coupled to the processor 1640, the processor 1640 and memory 1630 configured to perform various functions described herein.

The inter-station communications manager 1645 may manage communications with other base stations 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communications network technology to provide communication between base stations 105.

The communications manager 1620 may support wireless communications at a base station in accordance with examples as disclosed herein. For example, the communications manager 1620 may be configured as or otherwise support a means for transmitting, to a UE, a configuration indicating a set of multiple resource sets for a BWP for the UE, each of the set of multiple resource sets including reference signal resources that correspond to one or more antenna ports of the UE. The communications manager 1620 may be configured as or otherwise support a means for transmitting, to the UE, an activation message instructing the UE to activate at least one resource set of the set of multiple resource sets for reference signal transmission using the BWP. The communications manager 1620 may be configured as or otherwise support a means for receiving a reference signal over the activated at least one resource set using the BWP and at least one antenna port of the one or more antenna ports based on the activation message, the at least one antenna port corresponding to the activated at least one resource set.

By including or configuring the communications manager 1620 in accordance with examples as described herein, the device 1605 may support techniques for adaptive antenna switching and resource configuration within a BWP which may improve resource efficiency and power savings and reduce signaling overhead, among other advantages. As such, supported techniques may include improved network operations and, in some examples, may promote network efficiencies, among other benefits.

In some examples, the communications manager 1620 may be configured to perform various operations (e.g., receiving, monitoring, transmitting) using or otherwise in cooperation with the transceiver 1615, the one or more antennas 1625, or any combination thereof. Although the communications manager 1620 is illustrated as a separate component, in some examples, one or more functions described with reference to the communications manager 1620 may be supported by or performed by the processor 1640, the memory 1630, the code 1635, or any combination thereof. For example, the code 1635 may include instructions executable by the processor 1640 to cause the device 1605 to perform various aspects of adaptive antenna switching and resource configuration within a BWP as described herein, or the processor 1640 and the memory 1630 may be otherwise configured to perform or support such operations.

Figure 17:
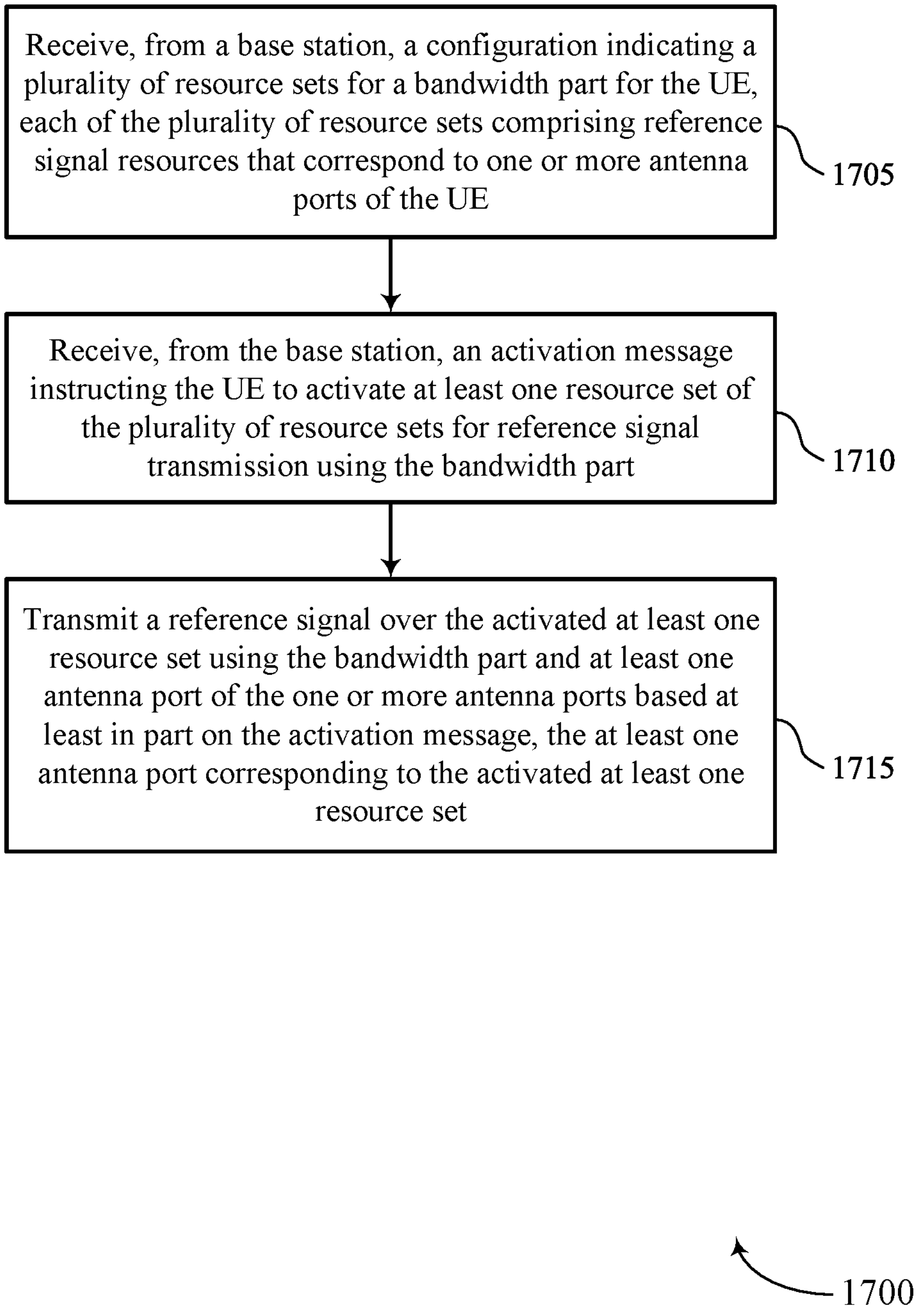
FIGS. 17-24 show flowcharts illustrating methods that support adaptive antenna switching and resource configuration within a BWP in accordance with aspects of the present disclosure.

FIG. 17 shows a flowchart illustrating a method 1700 that supports adaptive antenna switching and resource configuration within a BWP in accordance with aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1705, the method may include receiving, from a base station, a configuration indicating a set of multiple resource sets for a BWP for the UE, each of the set of multiple resource sets including reference signal resources that correspond to one or more antenna ports of the UE. The operations of 1705 may be performed in accordance with examples as disclosed herein. In some examples, aspects of the operations of 1705 may be performed by a configuration receiver 1125 as described with reference to FIG. 11.

At 1710, the method may include receiving, from the base station, an activation message instructing the UE to activate at least one resource set of the set of multiple resource sets for reference signal transmission using the BWP. The operations of 1710 may be performed in accordance with examples as disclosed herein. In some examples, aspects of the operations of 1710 may be performed by an activation message receiver 1130 as described with reference to FIG. 11.

At 1715, the method may include transmitting a reference signal over the activated at least one resource set using the BWP and at least one antenna port of the one or more antenna ports based on the activation message, the at least one antenna port corresponding to the activated at least one resource set. The operations of 1715 may be performed in accordance with examples as disclosed herein. In some examples, aspects of the operations of 1715 may be performed by a reference signal transmitter 1135 as described with reference to FIG. 11.

Figure 18:
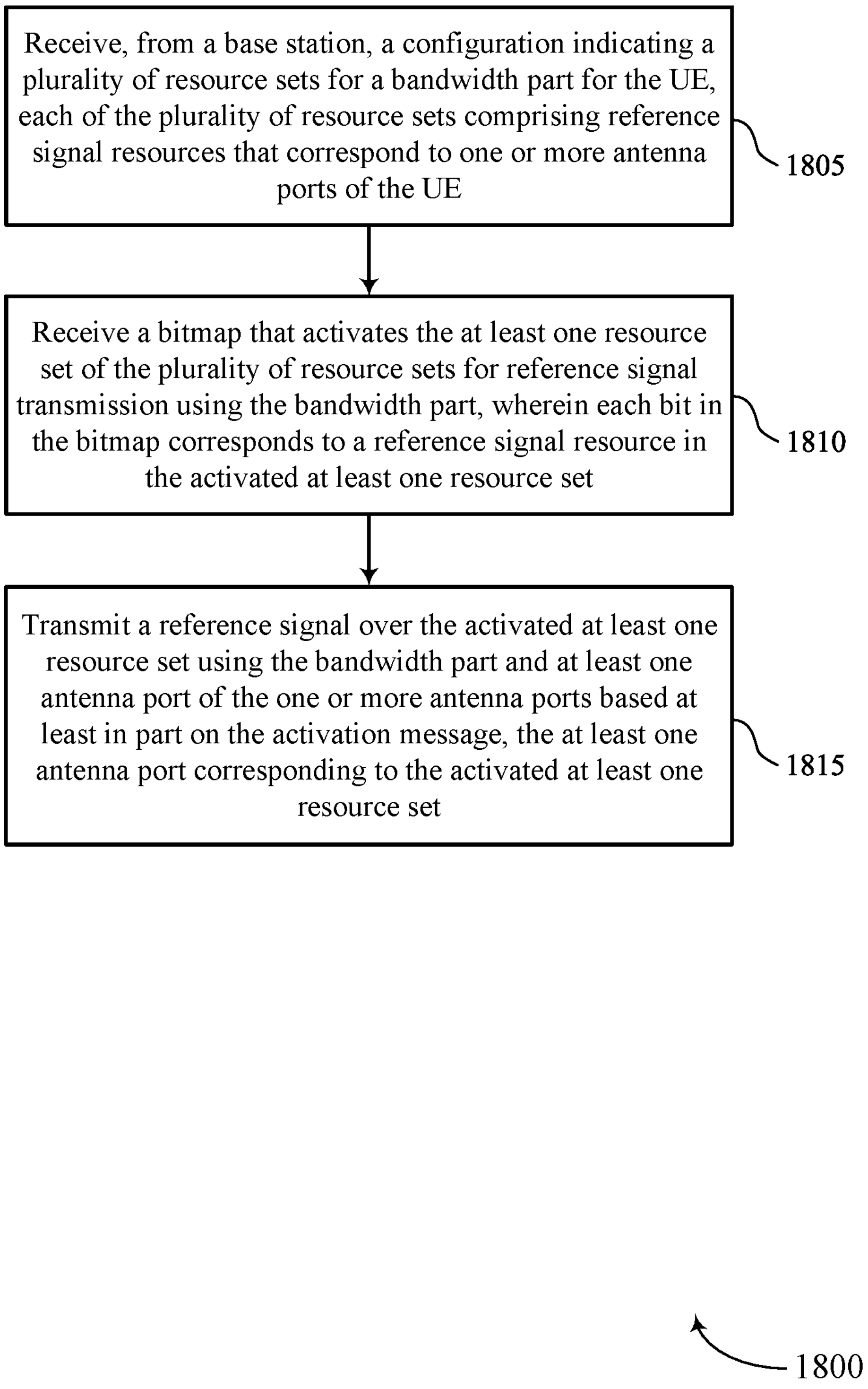

FIG. 18 shows a flowchart illustrating a method 1800 that supports adaptive antenna switching and resource configuration within a BWP in accordance with aspects of the present disclosure. The operations of the method 1800 may be implemented by a UE or its components as described herein. For example, the operations of the method 1800 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1805, the method may include receiving, from a base station, a configuration indicating a set of multiple resource sets for a BWP for the UE, each of the set of multiple resource sets including reference signal resources that correspond to one or more antenna ports of the UE. The operations of 1805 may be performed in accordance with examples as disclosed herein. In some examples, aspects of the operations of 1805 may be performed by a configuration receiver 1125 as described with reference to FIG. 11.

At 1810, the method may include receiving a bitmap that activates the at least one resource set of the set of multiple resource sets for reference signal transmission using the BWP, where each bit in the bitmap corresponds to a reference signal resource in the activated at least one resource set. The operations of 1810 may be performed in accordance with examples as disclosed herein. In some examples, aspects of the operations of 1810 may be performed by an activation message receiver 1130 as described with reference to FIG. 11.

At 1815, the method may include transmitting a reference signal over the activated at least one resource set using the BWP and at least one antenna port of the one or more antenna ports based on the activation message, the at least one antenna port corresponding to the activated at least one resource set. The operations of 1815 may be performed in accordance with examples as disclosed herein. In some examples, aspects of the operations of 1815 may be performed by a reference signal transmitter 1135 as described with reference to FIG. 11.

Figure 19:
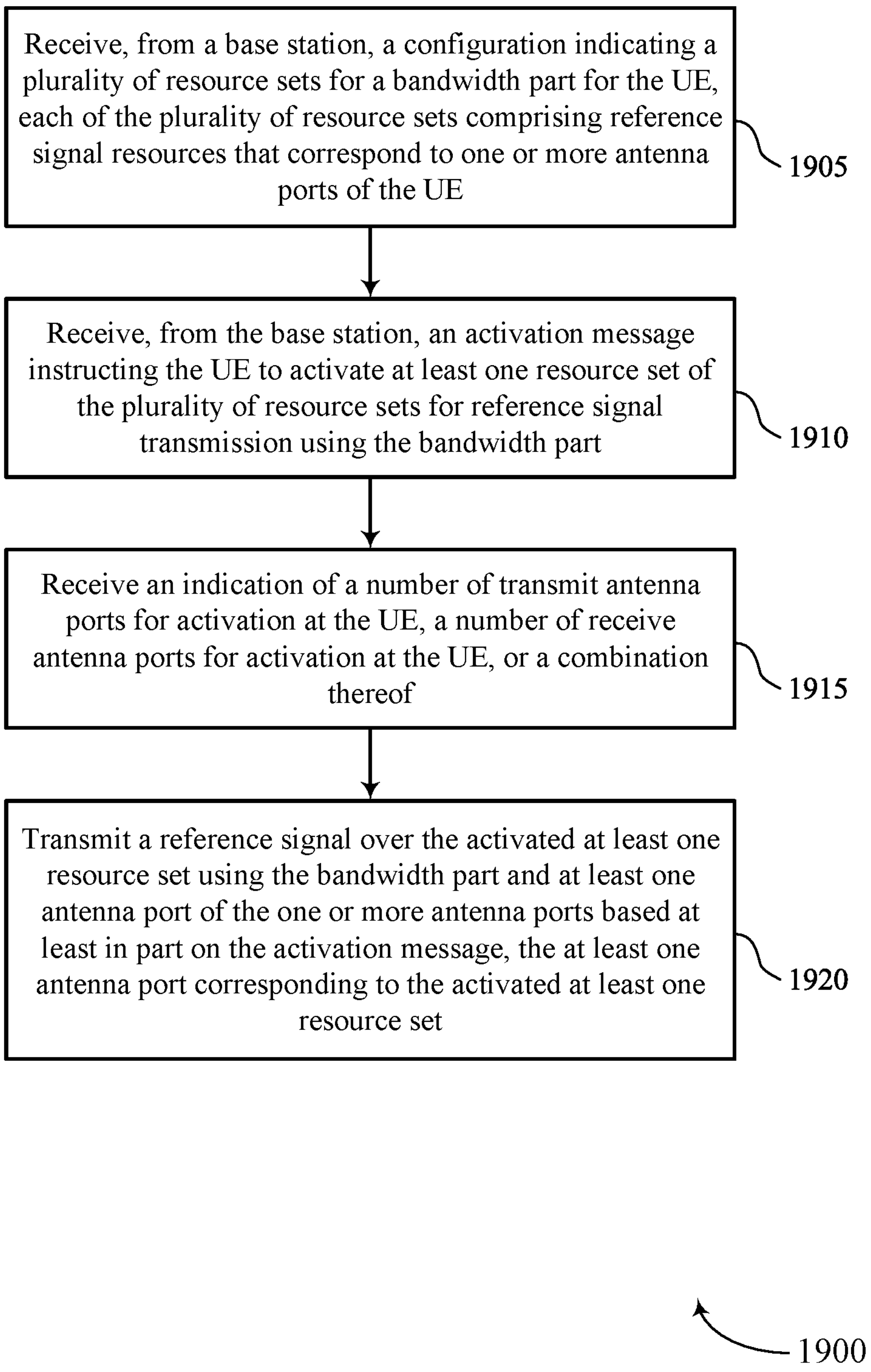

FIG. 19 shows a flowchart illustrating a method 1900 that supports adaptive antenna switching and resource configuration within a BWP in accordance with aspects of the present disclosure. The operations of the method 1900 may be implemented by a UE or its components as described herein. For example, the operations of the method 1900 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1905, the method may include receiving, from a base station, a configuration indicating a set of multiple resource sets for a BWP for the UE, each of the set of multiple resource sets including reference signal resources that correspond to one or more antenna ports of the UE. The operations of 1905 may be performed in accordance with examples as disclosed herein. In some examples, aspects of the operations of 1905 may be performed by a configuration receiver 1125 as described with reference to FIG. 11.

At 1910, the method may include receiving, from the base station, an activation message instructing the UE to activate at least one resource set of the set of multiple resource sets for reference signal transmission using the BWP. The operations of 1910 may be performed in accordance with examples as disclosed herein. In some examples, aspects of the operations of 1910 may be performed by an activation message receiver 1130 as described with reference to FIG. 11.

At 1915, the method may include receiving an indication of a number of transmit antenna ports for activation at the UE, a number of receive antenna ports for activation at the UE, or a combination thereof. The operations of 1915 may be performed in accordance with examples as disclosed herein. In some examples, aspects of the operations of 1915 may be performed by an antenna port indication receiver 1140 as described with reference to FIG. 11.

At 1920, the method may include transmitting a reference signal over the activated at least one resource set using the BWP and at least one antenna port of the one or more antenna ports based on the activation message, the at least one antenna port corresponding to the activated at least one resource set. The operations of 1920 may be performed in accordance with examples as disclosed herein. In some examples, aspects of the operations of 1920 may be performed by a reference signal transmitter 1135 as described with reference to FIG. 11.

Figure 20:
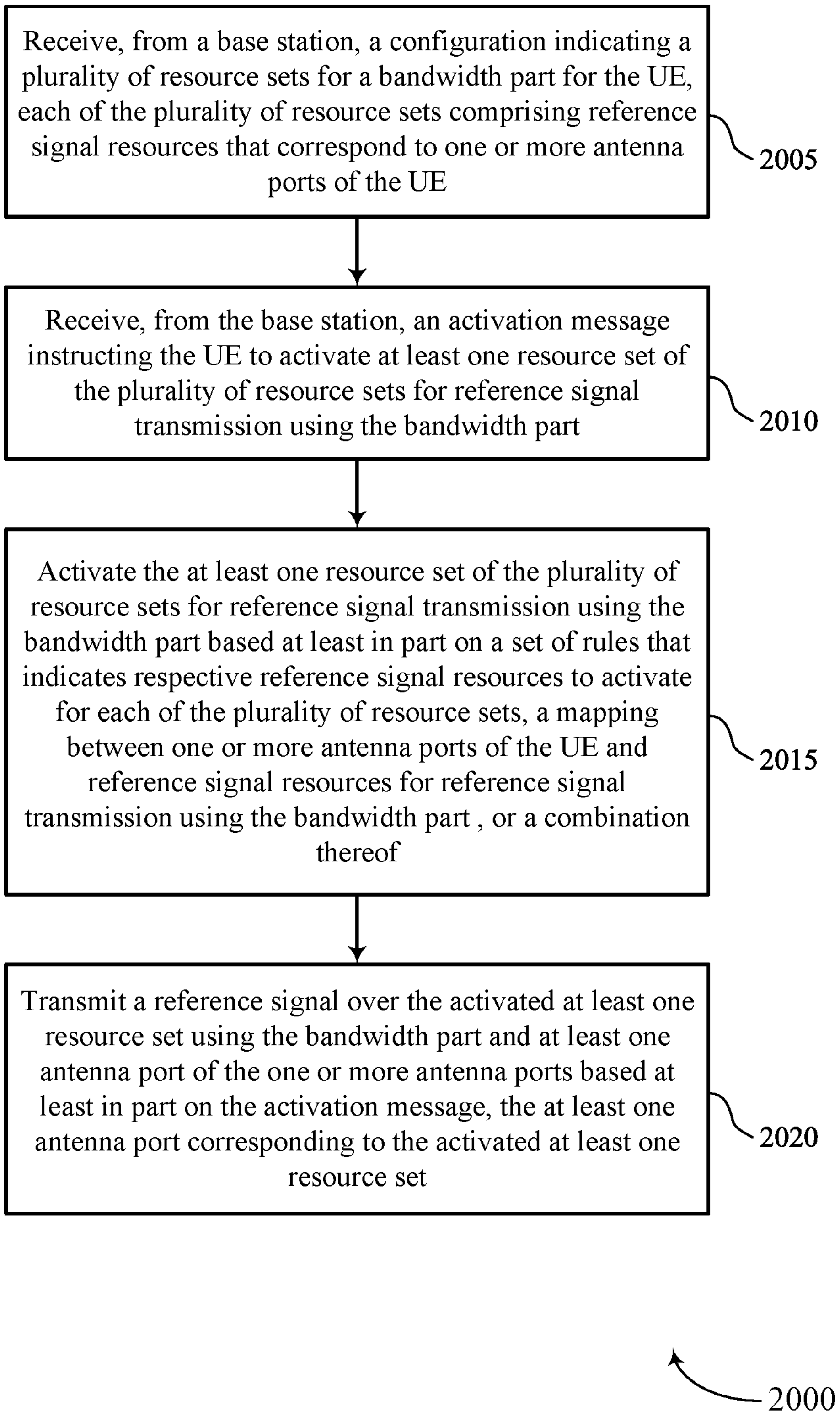

FIG. 20 shows a flowchart illustrating a method 2000 that supports adaptive antenna switching and resource configuration within a BWP in accordance with aspects of the present disclosure. The operations of the method 2000 may be implemented by a UE or its components as described herein. For example, the operations of the method 2000 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 2005, the method may include receiving, from a base station, a configuration indicating a set of multiple resource sets for a BWP for the UE, each of the set of multiple resource sets including reference signal resources that correspond to one or more antenna ports of the UE. The operations of 2005 may be performed in accordance with examples as disclosed herein. In some examples, aspects of the operations of 2005 may be performed by a configuration receiver 1125 as described with reference to FIG. 11.

At 2010, the method may include receiving, from the base station, an activation message instructing the UE to activate at least one resource set of the set of multiple resource sets for reference signal transmission using the BWP. The operations of 2010 may be performed in accordance with examples as disclosed herein. In some examples, aspects of the operations of 2010 may be performed by an activation message receiver 1130 as described with reference to FIG. 11.

At 2015, the method may include activating the at least one resource set of the set of multiple resource sets for reference signal transmission using the BWP based on a set of rules that indicates respective reference signal resources to activate for each of the set of multiple resource sets, a mapping between one or more antenna ports of the UE and reference signal resources for reference signal transmission using the BWP, or a combination thereof. The operations of 2015 may be performed in accordance with examples as disclosed herein. In some examples, aspects of the operations of 2015 may be performed by a resource activation component 1150 as described with reference to FIG. 11.

At 2020, the method may include transmitting a reference signal over the activated at least one resource set using the BWP and at least one antenna port of the one or more antenna ports based on the activation message, the at least one antenna port corresponding to the activated at least one resource set. The operations of 2020 may be performed in accordance with examples as disclosed herein. In some examples, aspects of the operations of 2020 may be performed by a reference signal transmitter 1135 as described with reference to FIG. 11.

Figure 21:
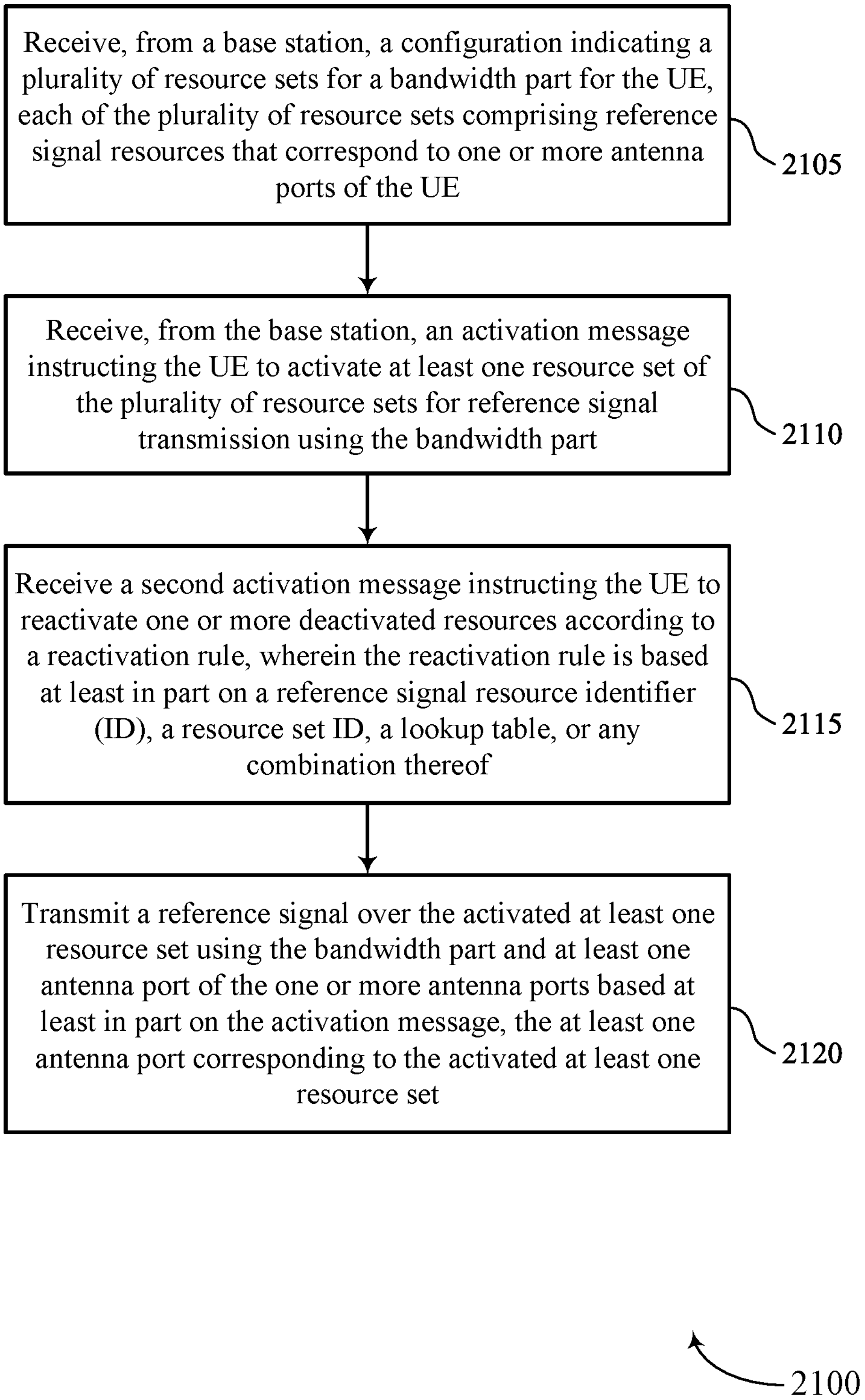

FIG. 21 shows a flowchart illustrating a method 2100 that supports adaptive antenna switching and resource configuration within a BWP in accordance with aspects of the present disclosure. The operations of the method 2100 may be implemented by a UE or its components as described herein. For example, the operations of the method 2100 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 2105, the method may include receiving, from a base station, a configuration indicating a set of multiple resource sets for a BWP for the UE, each of the set of multiple resource sets including reference signal resources that correspond to one or more antenna ports of the UE. The operations of 2105 may be performed in accordance with examples as disclosed herein. In some examples, aspects of the operations of 2105 may be performed by a configuration receiver 1125 as described with reference to FIG. 11.

At 2110, the method may include receiving, from the base station, an activation message instructing the UE to activate at least one resource set of the set of multiple resource sets for reference signal transmission using the BWP. The operations of 2110 may be performed in accordance with examples as disclosed herein. In some examples, aspects of the operations of 2110 may be performed by an activation message receiver 1130 as described with reference to FIG. 11.

At 2115, the method may include receiving a second activation message instructing the UE to reactivate one or more deactivated resources according to a reactivation rule, where the reactivation rule is based on a reference signal resource identifier (ID), a resource set ID, a lookup table, or any combination thereof. The operations of 2115 may be performed in accordance with examples as disclosed herein. In some examples, aspects of the operations of 2115 may be performed by an activation message receiver 1130 as described with reference to FIG. 11.

At 2120, the method may include transmitting a reference signal over the activated at least one resource set using the BWP and at least one antenna port of the one or more antenna ports based on the activation message, the at least one antenna port corresponding to the activated at least one resource set. The operations of 2120 may be performed in accordance with examples as disclosed herein. In some examples, aspects of the operations of 2120 may be performed by a reference signal transmitter 1135 as described with reference to FIG. 11.

Figure 22:
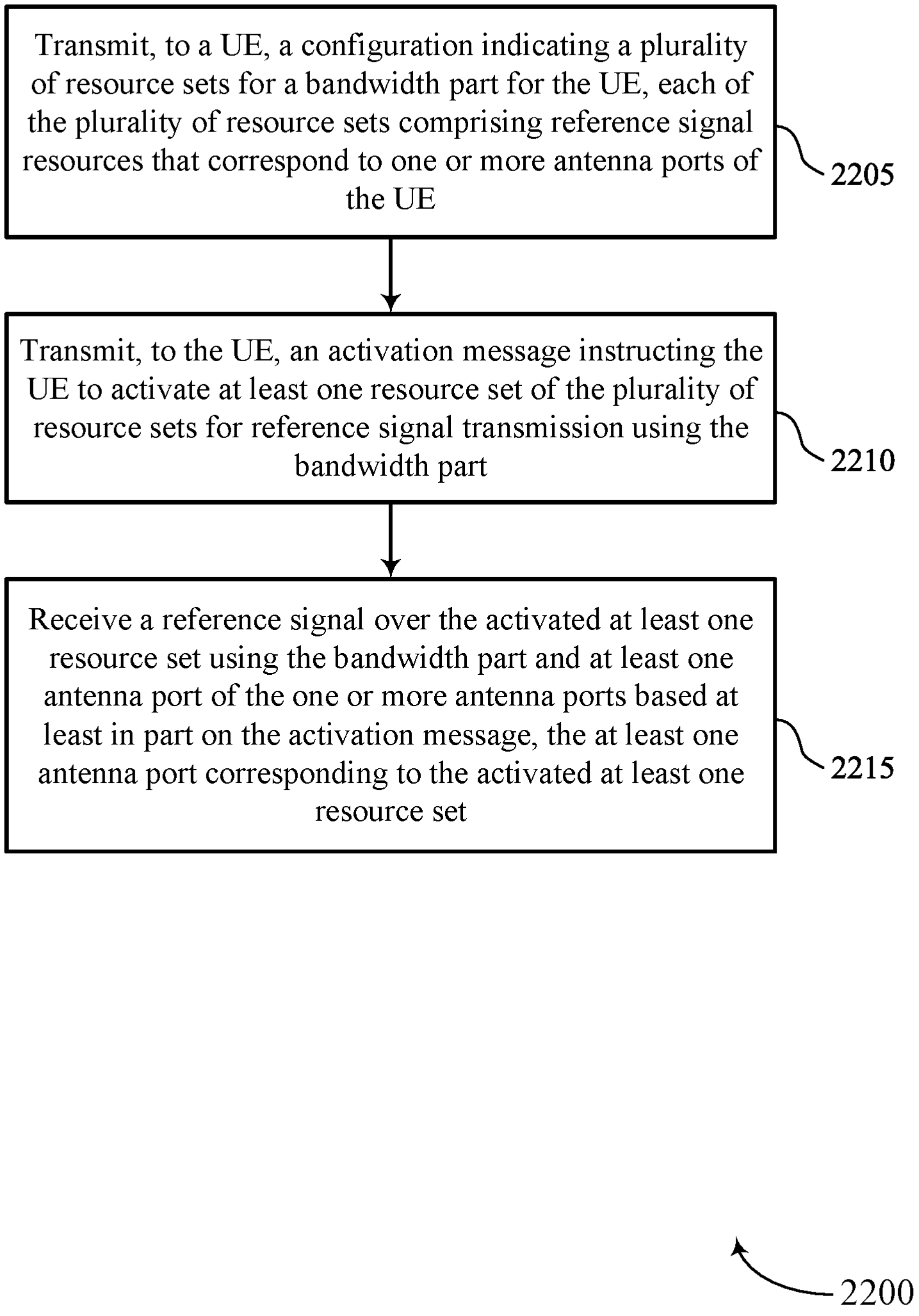

FIG. 22 shows a flowchart illustrating a method 2200 that supports adaptive antenna switching and resource configuration within a BWP in accordance with aspects of the present disclosure. The operations of the method 2200 may be implemented by a base station or its components as described herein. For example, the operations of the method 2200 may be performed by a base station 105 as described with reference to FIGS. 1 through 8 and 13 through 16. In some examples, a base station may execute a set of instructions to control the functional elements of the base station to perform the described functions. Additionally or alternatively, the base station may perform aspects of the described functions using special-purpose hardware.

At 2205, the method may include transmitting, to a UE, a configuration indicating a set of multiple resource sets for a BWP for the UE that map to different SRS antenna switching configurations (e.g., 1T8R, 1T4R, 1T2R), each of the set of multiple resource sets including reference signal resources that correspond to one or more antenna ports of the UE. The operations of 2205 may be performed in accordance with examples as disclosed herein. In some examples, aspects of the operations of 2205 may be performed by a configuration transmitter 1525 as described with reference to FIG. 15.

At 2210, the method may include transmitting, to the UE, an activation message instructing the UE to activate at least one resource set of the set of multiple resource sets for reference signal transmission using the BWP. The operations of 2210 may be performed in accordance with examples as disclosed herein. In some examples, aspects of the operations of 2210 may be performed by an activation message transmitter 1530 as described with reference to FIG. 15.

At 2215, the method may include receiving a reference signal over the activated at least one resource set using the BWP and at least one antenna port of the one or more antenna ports based on the activation message, the at least one antenna port corresponding to the activated at least one resource set. In some cases, the UE may indicate a preference of a different SRS antenna configuration which may be signaled via UE assistance information or via other signaling (e.g., an uplink MAC-CE requesting a different SRS antenna configuration). The operations of 2215 may be performed in accordance with examples as disclosed herein. In some examples, aspects of the operations of 2215 may be performed by a reference signal receiver 1535 as described with reference to FIG. 15.

Figure 23:
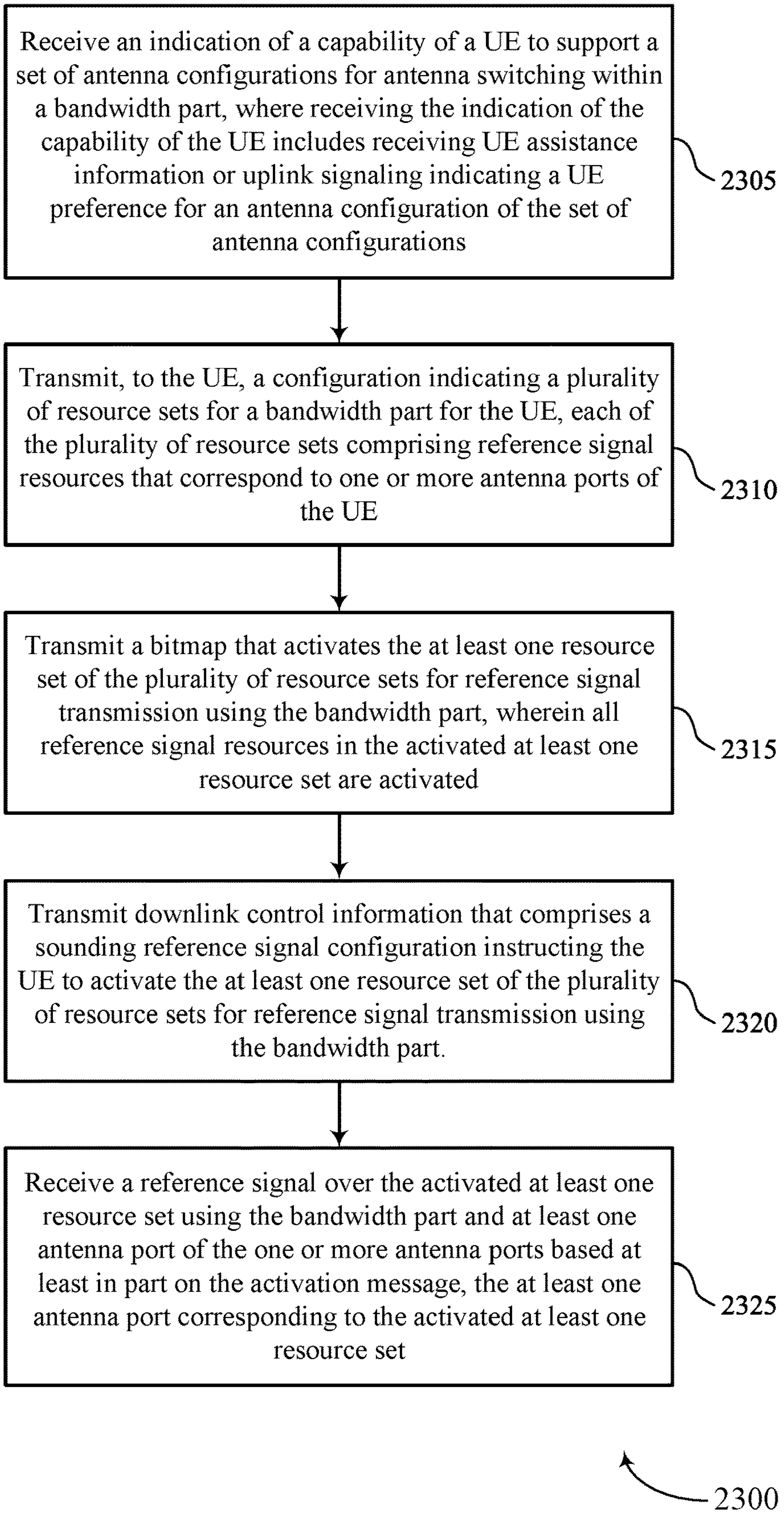

FIG. 23 shows a flowchart illustrating a method 2300 that supports adaptive antenna switching and resource configuration within a BWP in accordance with aspects of the present disclosure. The operations of the method 2300 may be implemented by a base station or its components as described herein. For example, the operations of the method 2300 may be performed by a base station 105 as described with reference to FIGS. 1 through 8 and 13 through 16. In some examples, a base station may execute a set of instructions to control the functional elements of the base station to perform the described functions. Additionally or alternatively, the base station may perform aspects of the described functions using special-purpose hardware.

At 2305, the method may include receiving, from a UE, an indication of a capability of the UE to support a set of antenna configurations for antenna switching within a BWP, where transmitting the indication of the capability of the UE includes receiving UE assistance information of uplink signaling indicating a UE preference for an antenna configuration of the set of antenna configurations.

At 2310, the method may include transmitting, to a UE, a configuration indicating a set of multiple resource sets for a BWP for the UE, each of the set of multiple resource sets including reference signal resources that correspond to one or more antenna ports of the UE. The operations of 2310 may be performed in accordance with examples as disclosed herein. In some examples, aspects of the operations of 2310 may be performed by a configuration transmitter 1525 as described with reference to FIG. 15.

At 2315, the method may include transmitting a bitmap that activates the at least one resource set of the set of multiple resource sets for reference signal transmission using the BWP, where all reference signal resources in the activated at least one resource set are activated. The operations of 2315 may be performed in accordance with examples as disclosed herein. In some examples, aspects of the operations of 2315 may be performed by an activation message transmitter 1530 as described with reference to FIG. 15.

At 2320, the method may include transmitting DCI that includes an SRS configuration instructing the UE to activate the at least one resource set of the plurality of resource sets for reference signal transmission using the BWP. The operations of 2320 may be performed in accordance with examples as disclosed herein. In some examples, aspects of the operations of 2320 may be performed by an activation transmitter 1530 as described with reference to FIG. 15.

At 2325, the method may include receiving a reference signal over the activated at least one resource set using the BWP and at least one antenna port of the one or more antenna ports based on the activation message, the at least one antenna port corresponding to the activated at least one resource set. The operations of 2325 may be performed in accordance with examples as disclosed herein. In some examples, aspects of the operations of 2325 may be performed by a reference signal receiver 1535 as described with reference to FIG. 15.

Figure 24:
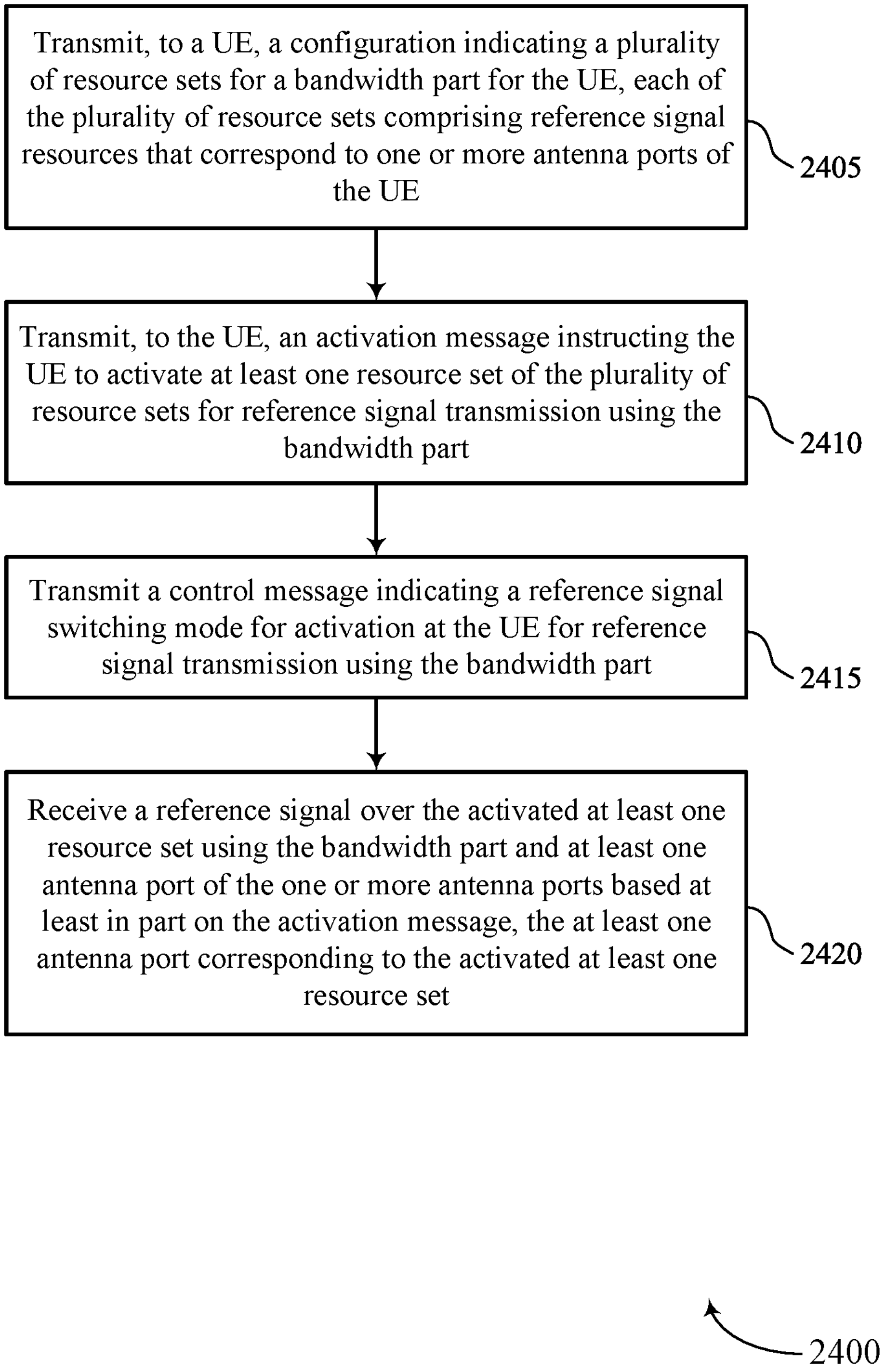

FIG. 24 shows a flowchart illustrating a method 2400 that supports adaptive antenna switching and resource configuration within a BWP in accordance with aspects of the present disclosure. The operations of the method 2400 may be implemented by a base station or its components as described herein. For example, the operations of the method 2400 may be performed by a base station 105 as described with reference to FIGS. 1 through 8 and 13 through 16. In some examples, a base station may execute a set of instructions to control the functional elements of the base station to perform the described functions. Additionally or alternatively, the base station may perform aspects of the described functions using special-purpose hardware.

At 2405, the method may include transmitting, to a UE, a configuration indicating a set of multiple resource sets for a BWP for the UE, each of the set of multiple resource sets including reference signal resources that correspond to one or more antenna ports of the UE. The operations of 2405 may be performed in accordance with examples as disclosed herein. In some examples, aspects of the operations of 2405 may be performed by a configuration transmitter 1525 as described with reference to FIG. 15.

At 2410, the method may include transmitting, to the UE, an activation message instructing the UE to activate at least one resource set of the set of multiple resource sets for reference signal transmission using the BWP. The operations of 2410 may be performed in accordance with examples as disclosed herein. In some examples, aspects of the operations of 2410 may be performed by an activation message transmitter 1530 as described with reference to FIG. 15.

At 2415, the method may include transmitting a control message indicating a reference signal switching mode for activation at the UE for reference signal transmission using the BWP. The operations of 2415 may be performed in accordance with examples as disclosed herein. In some examples, aspects of the operations of 2415 may be performed by a control message transmitter 1545 as described with reference to FIG. 15.

At 2420, the method may include receiving a reference signal over the activated at least one resource set using the BWP and at least one antenna port of the one or more antenna ports based on the activation message, the at least one antenna port corresponding to the activated at least one resource set. The operations of 2420 may be performed in accordance with examples as disclosed herein. In some examples, aspects of the operations of 2420 may be performed by a reference signal receiver 1535 as described with reference to FIG. 15.

The following provides an overview of aspects of the present disclosure:

Aspect 1: A method for wireless communications at a UE, comprising: receiving, from a base station, a configuration indicating a plurality of resource sets for a BWP for the UE, each of the plurality of resource sets comprising reference signal resources that correspond to one or more antenna ports of the UE; receiving, from the base station, an activation message instructing the UE to activate at least one resource set of the plurality of resource sets for reference signal transmission using the BWP; and transmitting a reference signal over the activated at least one resource set using the BWP and at least one antenna port of the one or more antenna ports based at least in part on the activation message, the at least one antenna port corresponding to the activated at least one resource set.

Aspect 2: The method of aspect 1, wherein receiving the activation message instructing the UE to activate the at least one resource set of the plurality of resource sets comprises: receiving a bitmap that activates the at least one resource set of the plurality of resource sets for reference signal transmission using the BWP, wherein each bit in the bitmap corresponds to a reference signal resource in the activated at least one resource set.

Aspect 3: The method of any of aspects 1 through 2, wherein receiving the activation message instructing the UE to activate the at least one resource set of the plurality of resource sets comprises: receiving a bitmap that activates the at least one resource set of the plurality of resource sets for reference signal transmission using the BWP, wherein all reference signal resources in the activated at least one resource set are activated.

Aspect 4: The method of any of aspects 1 through 3, wherein receiving the activation message instructing the UE to activate the at least one resource set of the plurality of resource sets comprises: receiving an SRI comprising an indication that the at least one resource set of the plurality of resource sets is activated for reference signal transmission using the BWP.

Aspect 5: The method of any of aspects 1 through 4, further comprising: receiving an indication of a number of transmit antenna ports for activation at the UE, a number of receive antenna ports for activation at the UE, or a combination thereof.

Aspect 6: The method of any of aspects 1 through 5, further comprising: receiving a control message indicating a reference signal switching mode for activation at the UE for reference signal transmission using the BWP.

Aspect 7: The method of any of aspects 1 through 6, further comprising: activating the at least one resource set of the plurality of resource sets for reference signal transmission using the BWP based at least in part on a set of rules that indicates respective reference signal resources to activate for each of the plurality of resource sets, a mapping between one or more antenna ports of the UE and reference signal resources for reference signal transmission using the BWP, or a combination thereof.

Aspect 8: The method of any of aspects 1 through 7, wherein receiving the activation message instructing the UE to activate the at least one resource set of the plurality of resource sets comprises: receiving an indication to activate a number of resource sets of the plurality of resource sets, a number of reference signal resources of a plurality of reference signal resources per resource set, or a combination thereof, for reference signal transmission using the BWP.

Aspect 9: The method of any of aspects 1 through 8, further comprising: receiving a second activation message instructing the UE to deactivate one or more resource sets of the plurality of resource sets; and deactivating the one or more resource sets of the plurality of resource sets.

Aspect 10: The method of aspect 9, wherein a first set of reference signal resources is activated and a second set of reference signal resources is deactivated according to an activation rule based at least in part on the second activation message, the activation rule indicating activation of reference signal resources based at least in part on a reference signal resource identifier (ID), a resource set ID, a codebook usage, a default set of reference signal resources, a default set of resource sets, a signal measurement of one or more antenna ports of the UE, a previous antenna port configuration, or any combination thereof.

Aspect 11: The method of any of aspects 1 through 10, further comprising: receiving a second activation message instructing the UE to reactivate one or more deactivated resources according to a reactivation rule, wherein the reactivation rule is based at least in part on a reference signal resource identifier (ID), a resource set ID, a lookup table, or any combination thereof.

Aspect 12: The method of any of aspects 1 through 11, wherein receiving the activation message instructing the UE to activate the at least one resource set of the plurality of resource sets further comprises: determining to reactivate the at least one resource set of a plurality of deactivated resource sets, at least one reference signal resource of a plurality of deactivated reference signal resources per resource set, or a combination thereof, for reference signal transmission using the BWP based at least in part on an antenna port mapping configuration for the UE.

Aspect 13: The method of any of aspects 1 through 12, further comprising: receiving an indication of a number of antenna ports of the UE per resource set or per reference signal resource to use for reference signal transmission using the BWP, wherein the indication comprises a set of bits indicating an antenna port configuration for the UE, a bitmap indicating which of the number of antenna ports of the UE to use for reference signal transmission, an activation rule, or any combination thereof.

Aspect 14: The method of aspect 13, further comprising: selecting a transmit power per antenna port for reference signal transmission based at least in part on the number of antenna ports.

Aspect 15: The method of any of aspects 1 through 14, wherein receiving the activation message instructing the UE to activate the at least one resource set of the plurality of resource sets comprises: receiving DCI that comprises an SRS configuration instructing the UE to activate the at least one resource set of the plurality of resource sets for reference signal transmission using the BWP.

Aspect 16: The method of any of aspects 1 through 15, further comprising: transmitting an indication of a capability of the UE to support the plurality of resource sets for the BWP, each of the plurality of resource sets comprising reference signal resources that correspond to one or more antenna ports of the UE.

Aspect 17: The method of any of aspects 1 through 16, further comprising: for transmitting an indication of a capability of the UE to support a set of antenna configurations for antenna switching within the BWP.

Aspect 18: The method of any of aspects 1 through 17, wherein transmitting an indication of a capability of the UE comprises: transmitting UE assistance information or uplink signaling indicating a UE preference for an antenna configuration of the set of antenna configurations.

Aspect 19: A method for wireless communications at a base station, comprising: transmitting, to a UE, a configuration indicating a plurality of resource sets for a BWP for the UE, each of the plurality of resource sets comprising reference signal resources that correspond to one or more antenna ports of the UE; transmitting, to the UE, an activation message instructing the UE to activate at least one resource set of the plurality of resource sets for reference signal transmission using the BWP; and receiving a reference signal over the activated at least one resource set using the BWP and at least one antenna port of the one or more antenna ports based at least in part on the activation message, the at least one antenna port corresponding to the activated at least one resource set.

Aspect 20: The method of aspect 19, wherein transmitting the activation message instructing the UE to activate the at least one resource set of the plurality of resource sets comprises: transmitting a bitmap that activates the at least one resource set of the plurality of resource sets for reference signal transmission using the BWP, wherein each bit in the bitmap corresponds to a reference signal resource in the activated at least one resource set.

Aspect 21: The method of any of aspects 19 through 20, wherein transmitting the activation message instructing the UE to activate the at least one resource set of the plurality of resource sets comprises: transmitting a bitmap that activates the at least one resource set of the plurality of resource sets for reference signal transmission using the BWP, wherein all reference signal resources in the activated at least one resource set are activated.

Aspect 22: The method of any of aspects 19 through 21, wherein transmitting the activation message instructing the UE to activate the at least one resource set of the plurality of resource sets comprises: transmitting an SRI comprising an indication that the at least one resource set of the plurality of resource sets is activated for reference signal transmission using the BWP.

Aspect 23: The method of any of aspects 19 through 22, further comprising: transmitting an indication of a number of transmit antenna ports for activation at the UE, a number of receive antenna ports for activation at the UE, or a combination thereof.

Aspect 24: The method of any of aspects 19 through 23, further comprising: transmitting a control message indicating a reference signal switching mode for activation at the UE for reference signal transmission using the BWP.

Aspect 25: The method of any of aspects 19 through 24, wherein transmitting the activation message instructing the UE to activate the at least one resource set of the plurality of resource sets comprises: transmitting an indication to activate a number of resource sets of the plurality of resource sets, a number of reference signal resources of a plurality of reference signal resources per resource set, or a combination thereof, for reference signal transmission using the BWP.

Aspect 26: The method of any of aspects 19 through 25, further comprising: transmitting a second activation message instructing the UE to deactivate one or more resource sets of the plurality of resource sets.

Aspect 27: The method of any of aspects 19 through 26, further comprising: transmitting a second activation message instructing the UE to reactivate one or more deactivated resource according to a reactivation rule, wherein the reactivation rule is based at least in part on a reference signal resource identifier (ID), a resource set ID, a lookup table, or any combination thereof.

Aspect 28: The method of any of aspects 19 through 27, further comprising: transmitting an indication of a number of antenna ports of the UE per resource set or per reference signal resource to use for reference signal transmission using the BWP, wherein the indication comprises a set of bits indicating an antenna port configuration for the UE, a bitmap indicating which of the number of antenna ports of the UE to use for reference signal transmission, an activation rule, or any combination thereof.

Aspect 29: The method of any of aspects 19 through 28, wherein transmitting the activation message instructing the UE to activate the at least one resource set of the plurality of resource sets comprises: transmitting DCI that comprises an SRS configuration instructing the UE to activate the at least one resource set of the plurality of resource sets for reference signal transmission using the BWP.

Aspect 30: The method of any of aspects 19 through 29, further comprising: receiving an indication of a capability of the UE to support the plurality of resource sets for the BWP, each of the plurality of resource sets comprising reference signal resources that correspond to one or more antenna ports of the UE.

Aspect 31: The method of any of aspects 19 through 30, further comprising: for receiving an indication of a capability of the UE to support a set of antenna configurations for antenna switching within the BWP.

Aspect 32: The method of any of aspects 19 through 31, wherein receiving an indication of a capability of the UE comprises: receiving UE assistance information or uplink signaling indicating a UE preference for an antenna configuration of the set of antenna configurations.

Aspect 33: An apparatus for wireless communications at a UE, comprising a processor; memory coupled with the processor; and instructions stored in the memory and executable by the processor to cause the apparatus to perform a method of any of aspects 1 through 16.

Aspect 34: An apparatus for wireless communications at a UE, comprising at least one means for performing a method of any of aspects 1 through 18.

Aspect 35: A non-transitory computer-readable medium storing code for wireless communications at a UE, the code comprising instructions executable by a processor to perform a method of any of aspects 1 through 18.

Aspect 36: An apparatus for wireless communications at a base station, comprising a processor; memory coupled with the processor; and instructions stored in the memory and executable by the processor to cause the apparatus to perform a method of any of aspects 19 through 32.

Aspect 37: An apparatus for wireless communications at a base station, comprising at least one means for performing a method of any of aspects 19 through 32.

Aspect 38: A non-transitory computer-readable medium storing code for wireless communications at a base station, the code comprising instructions executable by a processor to perform a method of any of aspects 19 through 32.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:

receiving, from a network device, a configuration indicating a plurality of resource sets for an active bandwidth part for the UE, each of the plurality of resource sets comprising reference signal resources that correspond to one or more antenna ports of the UE;

receiving, from the network device, an activation message instructing the UE to activate at least one resource set of the plurality of resource sets for reference signal transmission using the active bandwidth part; and transmitting a reference signal over the activated at least one resource set using the active bandwidth part and at least one antenna port of the one or more antenna ports based at least in part on the activation message, the at least one antenna port corresponding to the activated at least one resource set.

2. The method of claim 1, wherein receiving the activation message instructing the UE to activate the at least one resource set of the plurality of resource sets comprises:

receiving a bitmap that activates the at least one resource set of the plurality of resource sets for reference signal transmission using the active bandwidth part, wherein each bit in the bitmap corresponds to a reference signal resource in the activated at least one resource set.

3. The method of claim 1, wherein receiving the activation message instructing the UE to activate the at least one resource set of the plurality of resource sets comprises:

receiving a bitmap that activates the at least one resource set of the plurality of resource sets for reference signal transmission using the active bandwidth part, wherein all reference signal resources in the activated at least one resource set are activated.

4. The method of claim 1, wherein receiving the activation message instructing the UE to activate the at least one resource set of the plurality of resource sets comprises:

receiving a sounding reference signal resource indicator comprising an indication that the at least one resource set of the plurality of resource sets is activated for reference signal transmission using the active bandwidth part.

5. The method of claim 1, further comprising:

receiving an indication of a number of transmit antenna ports for activation at the UE, a number of receive antenna ports for activation at the UE, or a combination thereof.

6. The method of claim 1, further comprising:

receiving a control message indicating a reference signal switching mode for activation at the UE for reference signal transmission using the active bandwidth part.

7. The method of claim 1, further comprising:

activating the at least one resource set of the plurality of resource sets for reference signal transmission using the active bandwidth part based at least in part on a set of rules that indicates respective reference signal resources to activate for each of the plurality of resource sets, a mapping between one or more antenna ports of the UE and reference signal resources for reference signal transmission using the active bandwidth part, or a combination thereof.

8. The method of claim 1, wherein receiving the activation message instructing the UE to activate the at least one resource set of the plurality of resource sets comprises:

receiving an indication to activate a number of resource sets of the plurality of resource sets, a number of reference signal resources of a plurality of reference signal resources per resource set, or a combination thereof, for reference signal transmission using the active bandwidth part.

9. The method of claim 1, further comprising:

receiving a second activation message instructing the UE to deactivate one or more resource sets of the plurality of resource sets; and deactivating the one or more resource sets of the plurality of resource sets.

10. The method of claim 9, wherein a first set of reference signal resources is activated and a second set of reference signal resources is deactivated according to an activation rule based at least in part on the second activation message, the activation rule indicating activation of reference signal resources based at least in part on a reference signal resource identifier (ID), a resource set ID, a codebook usage, a default set of reference signal resources, a default set of resource sets, a signal measurement of one or more antenna ports of the UE, a previous antenna port configuration, or any combination thereof.

11. The method of claim 1, further comprising:

receiving a second activation message instructing the UE to reactivate one or more deactivated resources according to a reactivation rule, wherein the reactivation rule is based at least in part on a reference signal resource identifier (ID), a resource set ID, a lookup table, or any combination thereof.

12. The method of claim 1, wherein receiving the activation message instructing the UE to activate the at least one resource set of the plurality of resource sets further comprises:

determining to reactivate the at least one resource set of a plurality of deactivated resource sets, at least one reference signal resource of a plurality of deactivated reference signal resources per resource set, or a combination thereof, for reference signal transmission using the active bandwidth part based at least in part on an antenna port mapping configuration for the UE.

13. The method of claim 1, further comprising:

receiving an indication of a number of antenna ports of the UE per resource set or per reference signal resource to use for reference signal transmission using the active bandwidth part, wherein the indication comprises a set of bits indicating an antenna port configuration for the UE, a bitmap indicating which of the number of antenna ports of the UE to use for reference signal transmission, an activation rule, or any combination thereof.

14. The method of claim 13, further comprising:

selecting a transmit power per antenna port for reference signal transmission based at least in part on the number of antenna ports.

15. The method of claim 1, wherein receiving the activation message instructing the UE to activate the at least one resource set of the plurality of resource sets comprises:

receiving downlink control information that comprises a sounding reference signal configuration instructing the UE to activate the at least one resource set of the plurality of resource sets for reference signal transmission using the active bandwidth part.

16. The method of claim 1, further comprising:

transmitting an indication of a capability of the UE to support the plurality of resource sets for the active bandwidth part, each of the plurality of resource sets comprising reference signal resources that correspond to one or more antenna ports of the UE.

17. The method of claim 1, further comprising: transmitting an indication of a capability of the UE to support a set of antenna configurations for antenna switching within the active bandwidth part.

18. The method of claim 17, wherein transmitting the indication of the capability of the UE comprises: transmitting UE assistance information or uplink signaling indicating a UE preference for an antenna configuration of the set of antenna configurations.

19. A method for wireless communications at a network device, comprising:

transmitting, to a user equipment (UE), a configuration indicating a plurality of resource sets for an active bandwidth part for the UE, each of the plurality of resource sets comprising reference signal resources that correspond to one or more antenna ports of the UE;

transmitting, to the UE, an activation message instructing the UE to activate at least one resource set of the plurality of resource sets for reference signal transmission using the active bandwidth part; and receiving a reference signal over the activated at least one resource set using the active bandwidth part and at least one antenna port of the one or more antenna ports based at least in part on the activation message, the at least one antenna port corresponding to the activated at least one resource set.

20. The method of claim 19, wherein transmitting the activation message instructing the UE to activate the at least one resource set of the plurality of resource sets comprises: transmitting a bitmap that activates the at least one resource set of the plurality of resource sets for reference signal transmission using the active bandwidth part, wherein each bit in the bitmap corresponds to a reference signal resource in the activated at least one resource set.

21. The method of claim 19, wherein transmitting the activation message instructing the UE to activate the at least one resource set of the plurality of resource sets comprises: transmitting a bitmap that activates the at least one resource set of the plurality of resource sets for reference signal transmission using the active bandwidth part, wherein all reference signal resources in the activated at least one resource set are activated.

22. The method of claim 19, wherein transmitting the activation message instructing the UE to activate the at least one resource set of the plurality of resource sets comprises: transmitting a sounding reference signal resource indicator comprising an indication that the at least one resource set of the plurality of resource sets is activated for reference signal transmission using the active bandwidth part.

23. The method of claim 19, further comprising: transmitting an indication of a number of transmit antenna ports for activation at the UE, a number of receive antenna ports for activation at the UE, or a combination thereof.

24. The method of claim 19, further comprising: transmitting a control message indicating a reference signal switching mode for activation at the UE for reference signal transmission using the active bandwidth part.

25. The method of claim 19, wherein transmitting the activation message instructing the UE to activate the at least one resource set of the plurality of resource sets comprises: transmitting an indication to activate a number of resource sets of the plurality of resource sets, a number of reference signal resources of a plurality of reference signal resources per resource set, or a combination thereof, for reference signal transmission using the active bandwidth part.

26. The method of claim 19, further comprising: transmitting a second activation message instructing the UE to deactivate one or more resource sets of the plurality of resource sets.

27. The method of claim 19, further comprising: transmitting a second activation message instructing the UE to reactivate one or more deactivated resource according to a reactivation rule, wherein the reactivation rule is based at least in part on a reference signal resource identifier (ID), a resource set ID, a lookup table, or any combination thereof.

28. The method of claim 19, wherein transmitting the activation message instructing the UE to activate the at least one resource set of the plurality of resource sets comprises: transmitting downlink control information that comprises a sounding reference signal configuration instructing the UE to activate the at least one resource set of the plurality of resource sets for reference signal transmission using the active bandwidth part.

29. An apparatus for wireless communications at a user equipment (UE), comprising:

at least one processor;

at least one memory coupled with the at least one processor; and instructions stored in the at least one memory and executable by the at least one processor to cause the apparatus to:

receive, from a network device, a configuration indicating a plurality of resource sets for an active bandwidth part for the UE, each of the plurality of resource sets comprising reference signal resources that correspond to one or more antenna ports of the UE;

receive, from the network device, an activation message instructing the UE to activate at least one resource set of the plurality of resource sets for reference signal transmission using the active bandwidth part; and transmit a reference signal over the activated at least one resource set using the active bandwidth part and at least one antenna port of the one or more antenna ports based at least in part on the activation message, the at least one antenna port corresponding to the activated at least one resource set.

30. An apparatus for wireless communications at a network device, comprising:

at least one processor;

at least one memory coupled with the at least one processor; and instructions stored in the at least one memory and executable by the at least one processor to cause the apparatus to:

transmit, to a user equipment (UE), a configuration indicating a plurality of resource sets for an active bandwidth part for the UE, each of the plurality of resource sets comprising reference signal resources that correspond to one or more antenna ports of the UE;

transmit, to the UE, an activation message instructing the UE to activate at least one resource set of the plurality of resource sets for reference signal transmission using the active bandwidth part; and receive a reference signal over the activated at least one resource set using the active bandwidth part and at least one antenna port of the one or more antenna ports based at least in part on the activation message, the at least one antenna port corresponding to the activated at least one resource set.

* * * * *